(12) United States Patent
Morishita et al.

(10) Patent No.: US 9,360,715 B2
(45) Date of Patent: Jun. 7, 2016

(54) LIQUID CRYSTAL DISPLAY DEVICE

(71) Applicant: Sharp Kabushiki Kaisha, Osaka-shi, Osaka (JP)

(72) Inventors: Katsuhiko Morishita, Osaka (JP); Takehiko Sakai, Osaka (JP); Shogo Nishiwaki, Osaka (JP); Masashi Chino, Osaka (JP); Masatoshi Kondo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/399,033

(22) PCT Filed: Apr. 24, 2013

(86) PCT No.: PCT/JP2013/062015
§ 371 (c)(1),
(2) Date: Nov. 5, 2014

(87) PCT Pub. No.: WO2013/168566
PCT Pub. Date: Nov. 14, 2013

(65) Prior Publication Data
US 2015/0116644 A1    Apr. 30, 2015

(30) Foreign Application Priority Data

May 10, 2012    (JP) ................................ 2012-108793

(51) Int. Cl.
*G02F 1/1333*    (2006.01)
*G02F 1/1343*    (2006.01)
*G02F 1/1362*    (2006.01)
*G02F 1/1368*    (2006.01)
*G02F 1/1337*    (2006.01)

(52) U.S. Cl.
CPC ........ *G02F 1/134309* (2013.01); *G02F 1/1368* (2013.01); *G02F 1/133345* (2013.01); *G02F 1/134363* (2013.01); *G02F 1/136286* (2013.01); *G02F 1/133707* (2013.01); *G02F 1/133753* (2013.01); *G02F 2001/134372* (2013.01)

(58) Field of Classification Search
CPC .................... G02F 1/133345; G02F 1/134363; G02F 2001/134372; G02F 1/133707; G02F 1/133753
See application file for complete search history.

(56) References Cited

U.S. PATENT DOCUMENTS

| | | |
|---|---|---|
| 2008/0074602 A1 | 3/2008 | Arai et al. |
| 2010/0157222 A1 | 6/2010 | Arai et al. |
| 2012/0099066 A1* | 4/2012 | Ougiichi ........... G02F 1/133345 349/138 |

FOREIGN PATENT DOCUMENTS

| | | |
|---|---|---|
| JP | 2008-039806 A | 2/2008 |
| JP | 2008-083386 A | 4/2008 |
| JP | 2010-256547 A | 11/2010 |

OTHER PUBLICATIONS

Official Communication issued in International Patent Application No. PCT/JP2013/062015, mailed on Aug. 6, 2013.

*Primary Examiner* — Richard Kim
*Assistant Examiner* — Kendrick Hsu
(74) *Attorney, Agent, or Firm* — Keating & Bennett, LLP

(57) ABSTRACT

The present invention provides an FFS-mode liquid crystal display device which can prevent trace unevenness during white screen display. The present invention provides a liquid crystal display device including: a pair of substrate; and a liquid crystal layer interposed between the pair of substrates, wherein one of the pair of substrates includes a scanning signal line, a data signal line, pixel electrodes with a comb-tooth portion, a plate-like common electrode, and an interlayer insulating film provided between the pixel electrodes and the common electrode, the comb-tooth portion of each of the pixel electrodes includes a straight portion and a bent portion, the bent portion is provided at least at one end of the comb-tooth portion, and the interlayer insulating film is thinner at a position overlapping with the bent portion than at a position overlapping with the straight portion.

6 Claims, 17 Drawing Sheets

LIQUID CRYSTAL DISPLAY DEVICE

TECHNICAL FIELD

The present invention relates to a liquid crystal display device. More specifically, the present invention relates to a liquid crystal display device of a fringe field switching (FFS) mode including electrodes in different layers with an insulating film therebetween.

BACKGROUND ART

Liquid crystal display devices control transmission/shielding of light (ON/OFF of display) by controlling the alignment of birefringent liquid crystal molecules. Exemplary liquid crystal alignment modes of liquid crystal display devices include a twisted nematic (TN) mode in which liquid crystal molecules having positive anisotropy of dielectric constant aligned are twisted 90° when seen in the normal direction of a substrate, a vertical alignment (VA) mode in which liquid crystal molecules having negative anisotropy of dielectric constant are aligned in a direction perpendicular to a substrate surface, and an In-Plane Switching (IPS) mode and an FFS mode in which liquid crystal molecules having positive or negative anisotropy of dielectric constant are aligned in parallel with a substrate surface, and a transverse electric field is applied to a liquid crystal layer.

A popular driving method of liquid crystal display devices is an active-matrix driving method in which an active element such as a thin film transistor (TFT) is provided in each pixel to realize high-definition images. In an array substrate provided with a plurality of TFTs and a plurality of pixel electrodes, a plurality of scanning signal lines and a plurality of data signal lines are formed to cross each other, and the TFTs are provided for respective intersections. The TFTs are connected to the pixel electrodes and control whether or not to supply an image signal to the pixel electrodes by their switching functions. An array substrate or a counter substrate further includes a common electrode to apply a voltage inside a liquid crystal layer through a pair of electrodes.

Among the modes for controlling the alignment of liquid crystal molecules by applying a transverse electric field, the FFS mode is a liquid crystal alignment mode in which one substrate includes a first electrode and a second electrode and an insulating film is provided between the first electrode and the second electrode (see Patent Literature 1). The first electrode and the second electrode are formed of a light-transmitting conductive material such as indium tin oxide (ITO) and indium zinc oxide (IZO). One of the first electrode and the second electrode is connected to a common wiring and the other is connected to a TFT. The electrode connected to a TFT includes a plurality of slits formed therein. Providing such a pair of electrodes enables to generate a fringe electric field in a manner as to pass through the slits between the first electrode and the second electrode, thereby enabling to control the alignment of liquid crystals. According to Patent Literature 1, the shape of the electrode in which the slits are formed and the shape of the slits are adjusted so as not to cause disclination in liquid crystals.

CITATION LIST

Patent Literature

Patent Literature 1: JP-A 2010-256547

SUMMARY OF INVENTION

Technical Problem

The present inventors have intensively studied about FFS-mode liquid crystal display devices to focus on a problem that trace unevenness may occur when tracing is performed on the panel surface during white screen display. The trace unevenness refers to a phenomenon that, when a viewer traces a display screen with a touch pen or the like, a mark of the tracing is left. The cause of such trace unevenness is presumably as follows. The alignment of liquid crystal molecules is disturbed by a pressure at the tracing, and some liquid crystal molecules are aligned in the original direction and other liquid crystal molecules are problematically aligned in a direction opposite to the original direction. A detailed description is given below.

FIGS. 15 to 17 each are a schematic view illustrating behaviors of liquid crystal molecules when a pressure is applied to a display screen of a conventional FFS-mode liquid crystal display device and show a view of a display screen in an oblique direction and a plan view of a display screen.

As illustrated in FIG. 15, when a pressure is not applied to a display screen 101 in a white display state, liquid crystal molecules 131 are commonly aligned in a direction at substantially 45° relative to the major axis orientation of respective comb-tooth portions 111a of an electrode.

Subsequently, as illustrated in FIG. 16, when a pressure is applied to the display screen 101 by a contact of a touch pen 102 or the like, the applied pressure disturbs the alignment of the liquid crystal molecules 131. The disturbance is not uniform and depends on the place where the pressure is applied, the strength of the pressure or the like. The liquid crystal molecules 131 indicated by dotted lines in FIG. 16 show the alignment state before the application of the pressure and the liquid crystal molecules 131 indicated by solid lines show the alignment state immediately after the application of the pressure.

Then, as illustrated in FIG. 17, when the touch pen or the like is removed, the liquid crystal molecules 131 are released from the pressure and a force restoring the alignment is exerted thereon. However, some liquid crystal molecules may be aligned in an opposite direction, not in the original direction.

As a result, a part where both the liquid crystal molecules 131 aligned in the original direction and the liquid crystal molecules 131 aligned in the opposite direction are present presumably appears as trace unevenness 103.

The present invention, in consideration of the state of the art, aims to provide an FFS-mode liquid crystal display device which can prevent trace unevenness during white screen display.

Solution to Problem

In the following, a mechanism (principle) of suppressing trace unevenness by the present invention is described in more detail with reference to drawings.

First, a description is given on a cause of the trace unevenness. FIGS. 18 to 23 each are a schematic plan view illustrating a part of pixels of a conventional FFS-mode liquid crystal display device. FIGS. 18 to 20 each illustrate a state where a voltage of 4.4 V is applied to a liquid crystal layer and FIGS. 21 to 23 each illustrate a state where a voltage of 4.0 V is applied to a liquid crystal layer. The liquid crystal molecule 131 indicated by a solid line is a molecule before tracing (white display state) in FIG. 18, during tracing (white display state) in FIG. 19, and after tracing (white display state) in FIG. 20. The liquid crystal molecule 131 indicated by a dotted line is a molecule before tracing (black display state) in FIG. 18, right before tracing (white display state) in FIG. 19, and right before reversal (white display state) in FIG. 20. Here, a description is given on a case where a rubbing method is employed for the alignment. The same shall apply to a case where another method is employed.

As illustrated in FIG. 18, the liquid crystal molecules 131 in a black display state are aligned along a rubbing axis. When a voltage is applied between the comb-tooth portions 111a of the electrode and the counter electrode, the liquid crystal molecules 131 are rotated in an oblique direction in accordance with the level of the voltage. The liquid crystal molecules 131 in a white display state are aligned in an orientation inclined 45° relative to the major axis orientation of the comb-tooth portions 111a of the electrode.

When a pressure by tracing is applied to the liquid crystal molecules in such a state, as illustrated in FIG. 19, some of the liquid crystal molecules 131 are rotated over a line (dotted line) orthogonal to the major axis orientation of the comb-tooth portions 111a of the electrode. Then, as illustrated in FIG. 20, when released from the pressure, such liquid crystal molecules 131 rotated over the line are to go back to the original alignment orientation in a white display state but are problematically rotated largely to be stable in a state where the liquid crystal molecules are facing in the opposite direction relative to the direction before the application of the pressure. In such a case, the liquid crystal molecules facing in opposite directions, though aligned in the same orientation, are present. This causes trace unevenness on the display screen.

The present inventors examined how the alignment of the liquid crystal molecules is changed when the potential difference between electrodes is intendedly reduced. FIGS. 21 to 23 each are a schematic view illustrating a state where a voltage of 4.0 V is applied to a liquid crystal molecule.

As illustrated in FIG. 21, the liquid crystal molecules 131 in a black display state are aligned along the rubbing axis. When a voltage is applied between the comb-tooth portions 111a of the electrode and the counter electrode, the liquid crystal molecules 131 are rotated in an oblique direction in accordance with the level of the voltage. The liquid crystal molecules 131 at this time, however, are less rotated compared to a case where a voltage of 4.4 V is applied to the liquid crystal molecules 131. The reason for this is that an alignment controlling force by rubbing is greater than an alignment controlling force by an electric field compared to a case where a voltage of 4.4 V is applied to the liquid crystal molecules 131.

In such a state, even if a pressure by tracing is applied, the liquid crystal molecules 131 do not rotate over a line (dotted line) orthogonal to the major axis orientation of the comb-tooth portions 111a of the electrode as illustrated in FIG. 22. As a result, as illustrated in FIG. 23, the liquid crystal molecules 131 released from the pressure go back to the original alignment state and trace unevenness does not occur on the display screen.

The above clarifies that the orientation of the liquid crystal molecules 131 aligned is determined by a balance between the alignment controlling force by rubbing and the alignment controlling force by an electric field. Such a balance of the alignment controlling forces is likely to be lost not in central areas but in the vicinity of ends of the comb-tooth portions of the electrode.

Next, a description is given on a means for suppressing trace unevenness in the present invention. FIG. 24 is a schematic plan view illustrating a vicinity of ends of comb-tooth portions of an electrode in an FFS-mode liquid crystal display device of the present invention. As illustrated in FIG. 24, the comb-tooth portions 11a of the electrode each include a straight portion 11b and a bent portion 11c that is bending relative to the straight portion 11b. Here, the following is a condition for making the alignment controlling force by rubbing greater than the alignment controlling force by an electric field: An angle $\gamma$ formed between the major axis orientation of the bent portion 11c and the extending orientation of the scanning signal line and an angle $\beta$ formed between the orientation of alignment and the scanning signal line satisfy a relationship of $(135-\beta)°<\gamma<90°$. When the condition is satisfied, the liquid crystal molecules are less likely to be rotated over a line orthogonal to the major axis orientation of the comb-tooth portion 11a upon application of a pressure. As a result, trace unevenness is effectively suppressed.

According to another aspect of the present invention, even if the above inequality is not satisfied, the following method can suppress occurrence of a phenomenon that liquid crystal molecules are rotated over a line orthogonal to the major axis orientation of the comb-tooth portions. FIGS. 25 and 26 each are a schematic cross-sectional view illustrating an example of generation of an electric field in the vicinity of a comb-tooth portion of the electrode in the FFS-mode liquid crystal display device of the present invention. FIG. 25 illustrates an electric field in the vicinity of a bent portion of the comb-tooth portion of a pixel electrode and FIG. 26 illustrates an electric field in the vicinity of a straight portion of the comb-tooth portion of the pixel electrode. As illustrated in FIG. 25, one substrate in the FFS-mode liquid crystal display device of the present invention includes a supporting substrate 41, a common electrode 15, an interlayer insulating film 44, and a pixel electrode 11 in the stated order toward the liquid crystal layer 30 side. Comparison between FIG. 25 and FIG. 26 clarifies that the thickness of the interlayer insulating film 44 between the pixel electrode 11 and the common electrode 15 is different between a position overlapping with a straight portion 11b of the pixel electrode and a position overlapping with a bent portion 11c of the pixel electrode. Specifically, a thickness T1 of the interlayer insulating film 44 at a position overlapping with the bent portion 11c of the pixel electrode is smaller than a thickness t of the interlayer insulating film 44 at a position overlapping with the straight portion 11b of the pixel electrode. Due to the difference in thickness, formation of equipotential lines is also different between these parts. More specifically, as illustrated in FIG. 25, in the vicinity of the bent portion of the comb-tooth portion where the interlayer insulating film 44 is thinner, the equipotential lines are denser and the electric field is strong. Accordingly, in this part, the alignment controlling force by an electric field is stronger so that the liquid crystal molecules are likely to be aligned in a direction orthogonal to the major axis orientation of the bent portion. As a result, the liquid crystal molecules are less likely to be rotated over a line orthogonal to the major axis orientation of the comb-tooth portion. As illustrated in FIG. 26, in the vicinity of a thicker part of the interlayer insulating film 44 compared to the part in the vicinity of the bent portion of the comb-tooth portion of the pixel electrode, the equipotential lines are sparser and the electric field is weak. Accordingly, in this part, the alignment controlling force by rubbing is stronger. Based on the above principle, the liquid crystal display device of the present invention can suppress defective display caused by tracing.

The above clarifies that the feature of partly reducing the thickness of the interlayer insulating film is more effectively exerted in a case where bent portions of comb-tooth portions of the pixel electrode further satisfy a relationship of the γ and the β.

According to still another aspect of the present invention, the following method can suppress rotation of liquid crystal molecules over a line orthogonal to the major axis orientation of comb-tooth portions regardless of whether or not ends of the comb-tooth portions of a pixel electrode are bent.

FIGS. 27 and 28 each are a schematic cross-sectional view illustrating a vicinity of the comb-tooth portions of the pixel electrode in the FFS-mode liquid crystal display device of the present invention. FIG. 27 illustrates a vicinity of the comb-tooth portions positioned at an inner side and FIG. 28 illustrates a vicinity of the comb-tooth portions positioned at an outermost side. As illustrated in FIG. 27, one substrate of the FFS-mode liquid crystal display device of the present invention includes a supporting substrate 41, a common electrode 15, an interlayer insulating film 44, and a pixel electrode 11 in the stated order toward the liquid crystal layer 30 side. Comparison between FIG. 27 and FIG. 28 clarifies that the thickness of the interlayer insulating film 44 between the pixel electrode 11 and the common electrode 15 varies. Specifically, a thickness T2 of the interlayer insulating film 44 in an area overlapping with an area between the pixel electrodes 11 positioned in adjacent pixel areas is larger than a thickness t of the interlayer insulating film 44 in an area overlapping with an area between adjacent comb-tooth portions of the pixel electrode 11. The above difference causes difference in formation of equipotential lines. More specifically, as illustrated in FIG. 27, in a vicinity of a region where the interlayer insulating film 44 is thicker, electric flux lines are sparser and the electric field is weak. Accordingly, in this vicinity, the alignment controlling force by an electric field is weaker and the alignment controlling force by rubbing has a greater effect. As a result, even in a model in which a strong voltage is applied between the pixel electrodes 11 positioned in adjacent pixel areas (e.g., dot inversion driving system), the effect of the voltage is reduced and liquid crystal molecules are less likely to be rotated over a line orthogonal to the major axis orientation of the comb-tooth portion.

Here, in investigation of FIGS. 18 to 28, liquid crystal molecules positioned in the vicinity of the center in the thickness direction of the liquid crystal layer are focused among liquid crystal molecules contained in the liquid crystal layer. The reason for this is that, as illustrated in FIG. 29, an area where the level of the alignment controlling force by an electric field relative to the alignment controlling force by rubbing is the greatest is in the vicinity of the center in the thickness direction of the liquid crystal layer. FIG. 29 is a schematic cross-sectional view illustrating a state of formation of an electric field and alignment of liquid crystals in an FFS-mode liquid crystal display device. As illustrated in FIG. 29, in the FFS mode, an arc-shaped electric field is formed between a pixel electrode and a common electrode. In the vicinity of a substrate including respective electrodes, a generated electric field is dense and strong. In the vicinity of a counter substrate not including electrodes, a generated electric field is sparse and weak. In the vicinities of the substrate including electrodes and the counter substrate not including electrodes, the alignment controlling force by rubbing is stronger compared to the vicinity of the center in the thickness direction of the liquid crystal layer. Accordingly, an area where the level of the alignment controlling force by an electric field relative to the alignment controlling force by rubbing is greatest is the vicinity of the center in the thickness direction of the liquid crystal layer, which is more distant from an alignment film and is closer to the substrate including electrodes. Specifically, at least a vicinity of the center in the thickness direction of the liquid crystal layer needs to be focused because, in other regions, the alignment controlling force by rubbing is greater than the alignment controlling force by an electric field so that disclination of liquid crystals is suppressed.

Thus, the present inventors solved the above problem to arrive at the present invention.

One aspect of the present invention provides a liquid crystal display device including: a pair of substrates; and a liquid crystal layer interposed between the pair of substrates, wherein one of the pair of substrates includes a scanning signal line, a data signal line, pixel electrodes with a comb-tooth portion, a plate-like common electrode, and an interlayer insulating film provided between the pixel electrodes and the common electrode, the comb-tooth portion of each of the pixel electrodes includes a straight portion and a bent portion, the bent portion is provided at least at one end of the comb-tooth portion, and the interlayer insulating film is thinner at a position overlapping with the bent portion than at a position overlapping with the straight portion (hereafter, also referred to as a first liquid crystal display device).

Another aspect of the present invention provides a liquid crystal display device including: a pair of substrates; and a liquid crystal layer interposed between the pair of substrates, wherein one of the pair of substrates includes a scanning signal line, a data signal line, pixel electrodes with a comb-tooth portion, a plate-like common electrode, and an interlayer insulating film provided between the pixel electrodes and the common electrode, the comb-tooth portion includes a straight portion and a bent portion, the bent portion is provided at least at one end of the comb-tooth portion, and an angle γ formed between a major axis orientation of the bent portion and an extending orientation of the scanning signal line and an angle β formed between an orientation of alignment and the scanning signal line satisfy a relationship of $(135-\beta)° < \gamma < 90°$ (hereafter, also referred to as a second liquid crystal display device).

Still another aspect of the present invention provides a liquid crystal display device including: a pair of substrates; and a liquid crystal layer interposed between the pair of substrates, wherein one of the pair of substrates includes a scanning signal line, a data signal line, pixel electrodes with a comb-tooth portion, a plate-like common electrode, and an interlayer insulating film provided between the pixel electrodes and the common electrode, the pixel electrodes are arranged side by side with the scanning signal line or the data signal line therebetween, and the interlayer insulating film is thicker at a position between the pixel electrodes arranged side by side than at a position overlapping with the comb-tooth portion of each of the pixel electrodes (hereafter, also referred to as a third liquid crystal display device).

In each of the first to third liquid crystal display devices, since the pixel electrodes include a comb-tooth portion formed therein and a common electrode has a plate-like shape, a fringe electric field can be formed in a liquid crystal layer through these electrodes. In other words, each of the first to third liquid crystal display devices is of the FFS mode.

The interlayer insulating film included in each of the first to third liquid crystal display devices refers to an entire insulating film positioned between the pixel electrodes and the common electrode and may be a monolayer or a multilayer.

The term "bent portion" as used herein refers to a portion extending at a predetermined angle relative to the "straight portion".

The configurations of the first to third liquid crystal display devices of the present invention are not especially limited by other components as long as they essentially include such components.

A detailed description is given on preferable embodiments of the first to third liquid crystal display devices in the following. It is to be noted that an embodiment combining two or more preferable embodiments of respective liquid crystal display devices mentioned below is also a preferable embodiment of the liquid crystal display device.

Respective features of any of the first to third liquid crystal display devices can be applied to the rest of the first to third liquid crystal display devices without inconsistencies and the effect can be further enhanced. In particular, features of the first liquid crystal display device are compatible with features of the second liquid crystal display device. An effect of preventing rotation of liquid crystal molecules by bent portions, which is a feature of the first liquid crystal display device, can be synergistically enhanced by an effect of improving the alignment controlling force by an electric field in the vicinity of the bent portions, which is a feature of the second liquid crystal display device.

In the first liquid crystal display device, preferably, (i) an angle γ formed between a major axis orientation of the bent portion and an extending orientation of the scanning signal line and an angle β formed between an orientation of alignment and the scanning signal line satisfy a relationship of $(135-\beta)°<\gamma<90°$, and preferably, (ii) the pixel electrodes are arranged side by side with the scanning signal line or the data signal line therebetween, and the interlayer insulating film is thicker at a position between the pixel electrodes arranged side by side than at a position overlapping with the comb-tooth portion of each of the pixel electrodes.

In the second liquid crystal display device, preferably, (i) the bent portion is provided at least at one end of the comb-tooth portion, and the interlayer insulating film is thinner at a position overlapping with the bent portion than at a position overlapping with the straight portion, and preferably, (ii) the pixel electrodes are arranged side by side with the scanning signal line or the data signal line therebetween, and the interlayer insulating film is thicker at a position between the pixel electrodes arranged side by side than at a position overlapping with the comb-tooth portion of each of the pixel electrodes.

In the third liquid crystal display device, preferably, (i) an angle γ formed between a major axis orientation of the bent portion and an extending orientation of the scanning signal line and an angle β formed between an orientation of alignment and the scanning signal line satisfy a relationship of $(135-\beta)°<\gamma<90°$, and preferably, (ii) the bent portion is provided at least at one end of the comb-tooth portion, and the interlayer insulating film is thinner at a position overlapping with the bent portion than at a position overlapping with the straight portion.

In the first and second liquid crystal display devices, the bent portion is preferably provided at both ends of the comb-tooth portion. Such configuration enables to reduce an area where the alignment of the liquid crystal molecules tends to be disturbed.

In the first and second liquid crystal display devices, the bent portion is preferably provided at the center of the comb-tooth portion. Such configuration enables to reduce an area where the alignment of the liquid crystal molecules tends to be disturbed.

The first to third liquid crystal display devices each preferably further include a voltage applying means that sets potentials of the pixel electrodes adjacent to each other have opposite polarity based on a potential of the common electrode. In other words, the present embodiment is of a line inversion driving system or a dot inversion driving system. This can reduce generation of flicker. However, since potentials provided to the pixel electrodes adjacent to each other have inverse characteristics, liquid crystal molecules are aligned along an arrangement direction of the adjacent pixel electrodes. In such a case, liquid crystals tend to be aligned over a line along the arrangement direction of the adjacent pixel electrodes when a pressure is applied, so that disclination of liquid crystals tends to occur. To solve this problem, according to the first to third liquid crystal display devices, especially to the third liquid crystal display device, the electric field between the adjacent pixel electrodes is weakened to enlarge the influence by the alignment controlling force, so that the alignment controlling force by the alignment film is relatively enlarged, contributing to suppression of trace unevenness.

Advantageous Effects of Invention

According to the FFS-mode liquid crystal display device of the present invention, even if tracing is performed on a panel surface, trace unevenness by the tracing pressure is effectively suppressed.

DESCRIPTION OF EMBODIMENTS

In the following, the present invention is more specifically described based on, but not limited to, embodiments with reference to drawings.

Liquid crystal display devices of embodiments 1 to 5 mentioned below are specifically usable for TVs, PCs, mobile phones, car navigation systems, information displays, and the like, and are especially favorably used for liquid crystal display devices equipped with a touch panel. Estimated cases where trace unevenness occurs include a case where a screen is touched with a pointed object such as touch pens and fingers.

Embodiment 1

Figure 1:
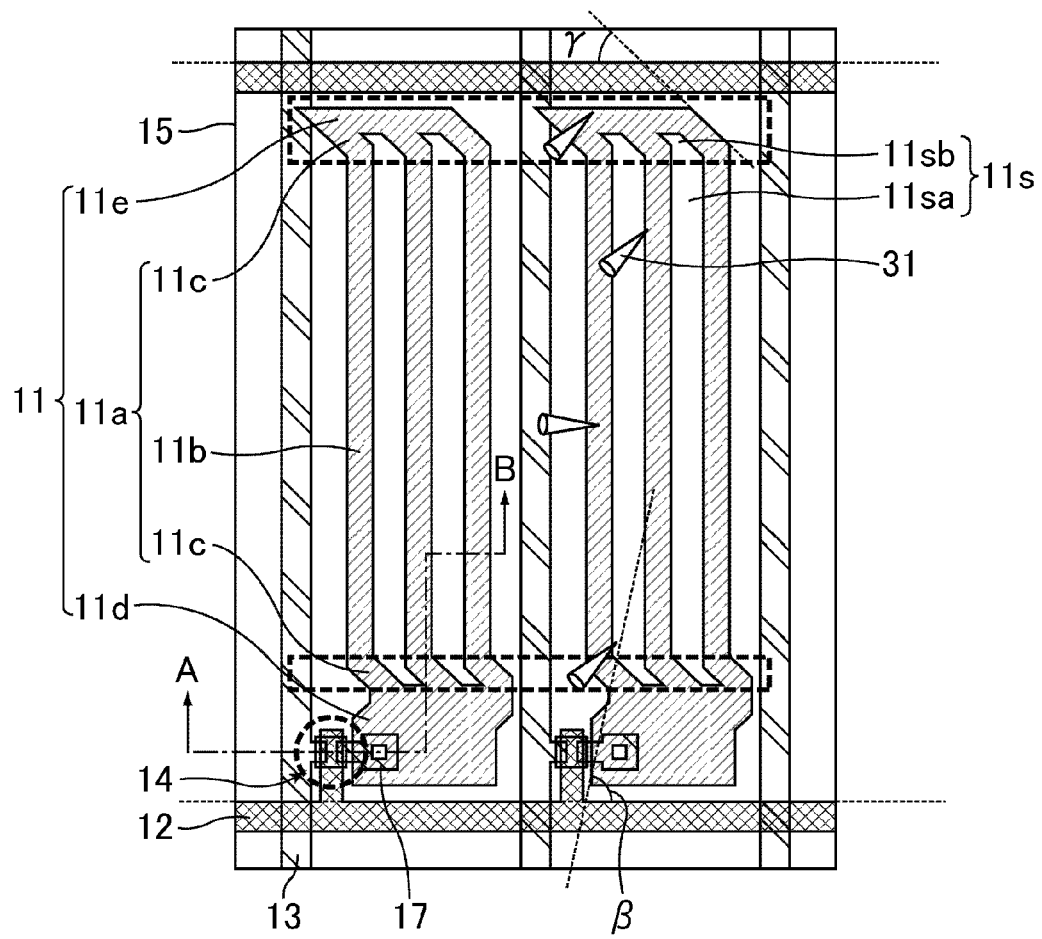
FIG. 1 is a schematic plan view illustrating a pixel structure of an array substrate included in a liquid crystal display device of Embodiment 1.

FIG. 1 is a schematic plan view illustrating a pixel structure of an array substrate included in a liquid crystal display device of Embodiment 1. As illustrated in FIG. 1, in a plan view of the array substrate in Embodiment 1, scanning signal lines 12 and data signal lines 13 are arranged to cross each other and to surround a pixel electrodes 11. In the vicinity of each intersection of the scanning signal lines 12 and the data signal lines 13, a TFT (Thin Film Transistor) 14 is provided. The scanning signal lines 12 and the data signal lines 13 are extended orthogonally to each other.

The TFT 14 is a switching element including a semiconductor layer and three electrodes (a gate electrode, a source electrode, and a drain electrode). The gate electrode is branched from a scanning signal line. The drain electrode is connected to the pixel electrode 11 through a contact portion penetrating through an insulating film. The semiconductor layer is provided directly above the gate electrode through a gate insulating film. The source electrode is branched from the data signal line 13. The semiconductor layer is in contact with the source electrode and the drain electrode. An image signal supplied from the data signal line 13 is sequentially supplied to the source electrode, the semiconductor layer, the drain electrode, and the pixel electrode 11 when a gate voltage is applied to the gate electrode through the scanning signal line 12.

The pixel electrodes 11 are a plurality of comb-shaped electrodes each provided in an area (hereafter, also referred to as a pixel area) surrounded by the scanning signal lines 12 and the data signal lines 13 and each pixel electrode 11 includes a plurality of slits 11s formed therein. In a case where the slits 11s are formed inside the pixel electrode 11, an arc-shaped electric field formed between the pixel electrode 11 and the common electrode 15 is generated inside a liquid crystal layer.

The pixel electrodes 11 include comb-tooth portions 11a. The comb-tooth portions 11a each include a straight portion 11b in parallel with the lengthwise direction of the data signal lines 13 and bent portions 11c extending at a predetermined angle relative to the lengthwise direction of the straight portion 11b. Respective bent portions 11c are extended from both ends of respective straight portions 11b. Respective bent portions 11c are extended in parallel with each other. The comb-tooth portion 11a has a point symmetrical shape with respect to the center point of the comb-tooth portion 11a. Such a symmetrical structure enables to adjust the balance of the alignment of liquid crystal molecules 31. In such configuration, the slits 11s formed in the pixel electrode 11 each include a straight portion 11sa in parallel with the lengthwise direction of the data signal lines 13 and a bent portion 11sb extending at a predetermined angle relative to the lengthwise direction of the straight portion 11sa. The number of the slits 11s is not particularly limited.

The pixel electrodes 11 include a wide portion 11d near the TFT 14 for ensuring a region required for connection with the TFT 14. At a position overlapping with the wide portion 11d of the pixel electrode, an insulating film includes a contact portion 17. Through the contact portion 17, the pixel electrode 11 and the drain electrode are electrically connected.

Moreover, the pixel electrode 11 includes a straight portion 11e in parallel with the extending direction of the scanning signal lines 12. The straight portion lie is extending so as to enclose each slit 11s, namely, so as to connect ends of respective bent portions 11b to one another. Accordingly, respective slits 11s are surrounded by the main body of the pixel electrode 11.

In Embodiment 1, the major axis orientation of the bent portions 11c of the pixel electrode is not particularly limited. Preferably, an angle $\gamma$ formed between the major axis orientation of the bent portions 11c and the extending orientation of the scanning signal lines 12 and an angle $\beta$ formed between the orientation of alignment and the scanning signal lines 12 satisfy $(135-\beta)°<\gamma<90°$. More preferably, $50°<\gamma<60°$ is satisfied. If the angle $\gamma$ is smaller than 50°, reduction in the transmittance is significant. If the angle $\gamma$ is larger than 60°, the effect of reducing trace unevenness tends to be lowered.

To the common electrode 15, a constant common signal is supplied through a common signal line. The common electrode 15 may be formed in each pixel area or formed widely across a plurality of pixel areas, provided that the common electrode 15 at least has a plate-like shape, that is, a shape without slits in a region overlapping with the comb-tooth portions 11a of the pixel electrodes.

In Embodiment 1, at positions where the bent portions 11c and the straight portions 11e of the pixel electrodes are overlapping with each other, an interlayer insulating film (hereafter, also referred to as a first interlayer insulating film) having a smaller thickness is formed. A region surrounded by a dotted line in FIG. 1 is a region where the first interlayer insulating film is formed. Here, the "smaller thickness" is based on the thickness of an interlayer insulating film (hereafter also referred to as a second interlayer insulating film) at a position overlapping with the straight portions 11b of the pixel electrodes. For example, when the relative dielectric constant $\in_r$ of materials forming the interlayer insulating film is 6.0 and the thickness of the second interlayer insulating film is 0.2 μm, the thickness of the first interlayer insulating film is preferably 0.1 μm to 0.15 μm. In this case, if the thickness of the first interlayer insulating film is smaller than 0.1 μm, leak tends to be caused between the pixel electrode 11 and the common electrode 15. If the thickness of the first interlayer insulating film is larger than 0.15 μm, the effect of reducing trace unevenness is lowered.

Exemplary methods for partly changing the interlayer insulating film include a method of utilizing half exposure in photolithography.

The level of the effect of preventing trace unevenness in Embodiment 1 depends on the angle $\gamma$ of the major axis orientation of the bent portions 11c in the pixel electrode and the difference in thickness between the first interlayer insulating film and the second interlayer insulating film. Appropriate adjustment of these can favorably prevent trace unevenness.

Figure 2:
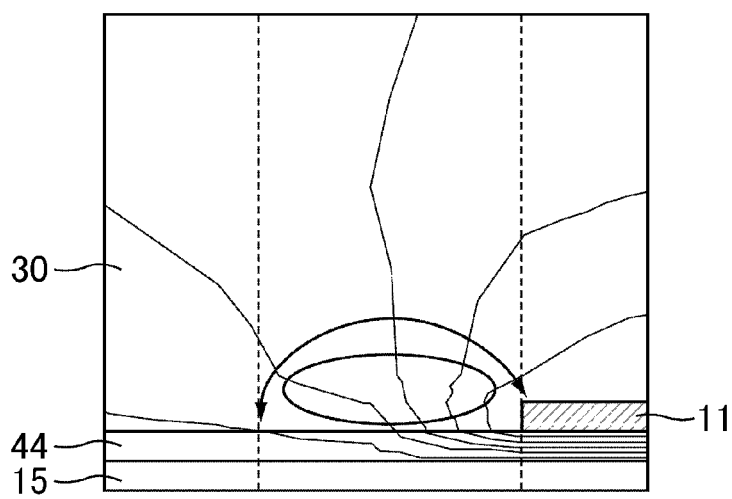
FIG. 2 is a schematic cross-sectional view illustrating in detail a vicinity of a comb-tooth portion of a pixel electrode in Embodiment 1 and illustrates a vicinity of a bent portion of the pixel electrode.
Figure 3:
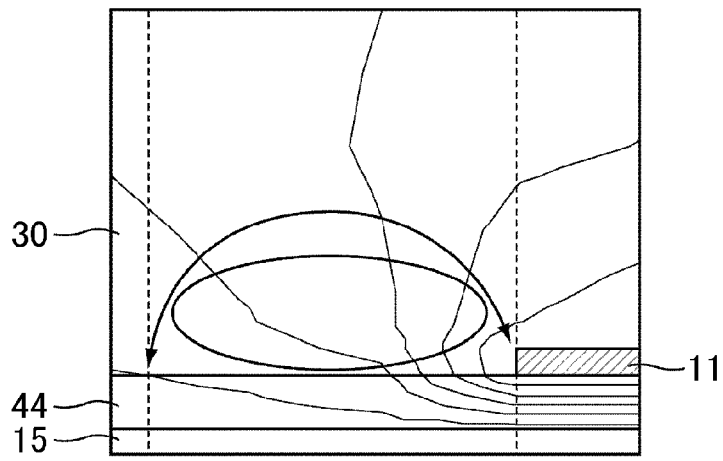
FIG. 3 is a schematic cross-sectional view illustrating in detail a vicinity of the comb-tooth portion of the pixel electrode in Embodiment 1 and illustrates a vicinity of a straight portion of the pixel electrode.

FIGS. 2 and 3 each are a schematic cross-sectional view illustrating in detail a vicinity of the comb-tooth portion of the pixel electrode in Embodiment 1. FIG. 2 illustrates a vicinity of the bent portion of the pixel electrode and FIG. 3 illustrates a vicinity of the straight portion of the pixel electrode. In the liquid crystal display device of Embodiment 1, the common electrode 15, the interlayer insulating film 44, and the pixel electrode 11 are stacked in the stated order toward the liquid crystal layer 30. Comparison between FIG. 2 and FIG. 3 clarifies that the interlayer insulating film 44 is thinner at a position overlapping with the bent portion 11c of the pixel electrode than at a position overlapping with the straight portion 11b of the pixel electrode. With such configuration, equipotential lines in the vicinity of the bent portion 11c of the pixel electrode are more dense compared to equipotential lines in the vicinity of the straight portion 11b of the pixel electrode, and the electric field in the vicinity of the bent portion 11c of the pixel electrode is stronger than the electric field in the vicinity of the straight portion 11b of the pixel electrode. Commonly, at ends of the comb-tooth portions of the pixel electrode, the alignment of liquid crystals tends to be disturbed. With the configuration described above, the alignment controlling force by an electric field in a direction orthogonal to the major axis orientation of the bent portions 11c of the pixel electrode is enhanced, so that the alignment of liquid crystal molecules is prevented from being significantly disturbed by a pressure applied thereon.

Figure 4:
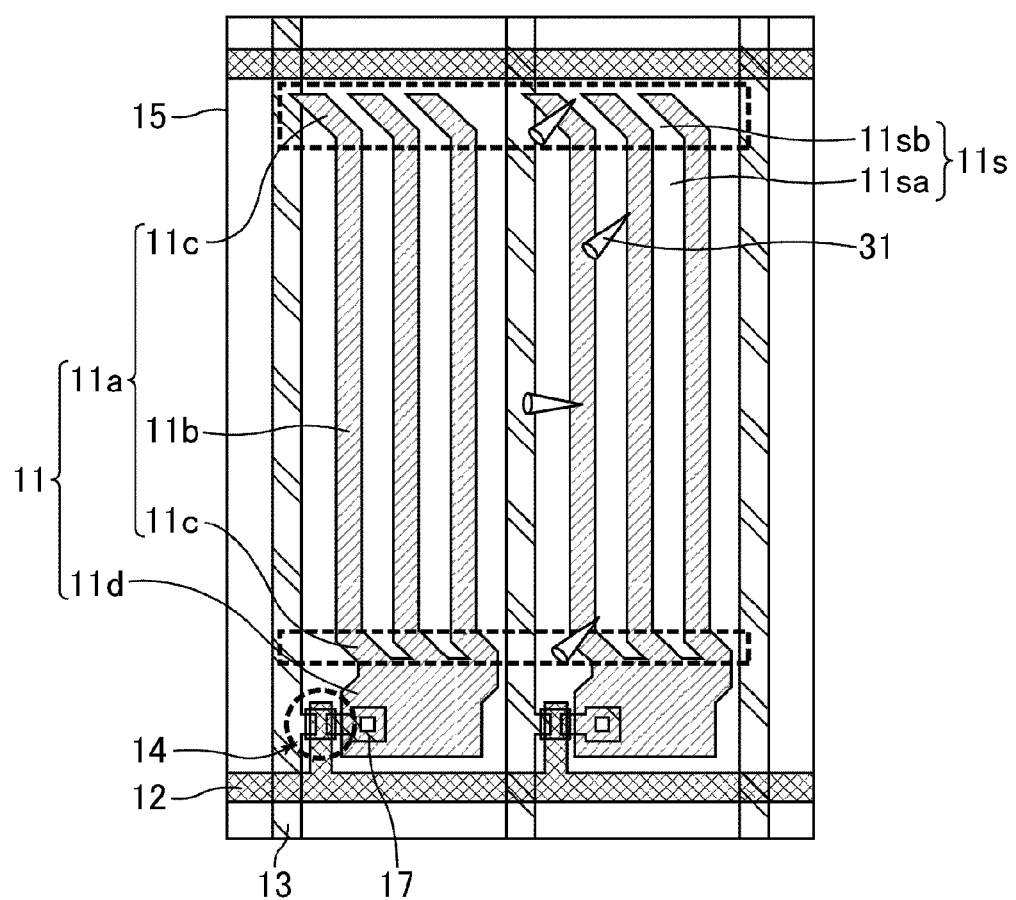
FIG. 4 is a schematic plan view illustrating a pixel structure of a first modified example of the array substrate included in the liquid crystal display device of Embodiment 1.

For a first modified example of the liquid crystal display device of Embodiment 1, as illustrated in FIG. 4, a case where the ends of the slits 11s are open. Even in such an embodiment, a fringe electric field can be formed between the pixel electrode 11 and the common electrode 15 and the bent portions 11c are formed at ends of the comb-tooth portions 11a of the pixel electrode. Accordingly, the alignment of the liquid crystal molecules 31 is similarly prevented from being significantly disturbed by a pressure applied thereon.

Figure 5:
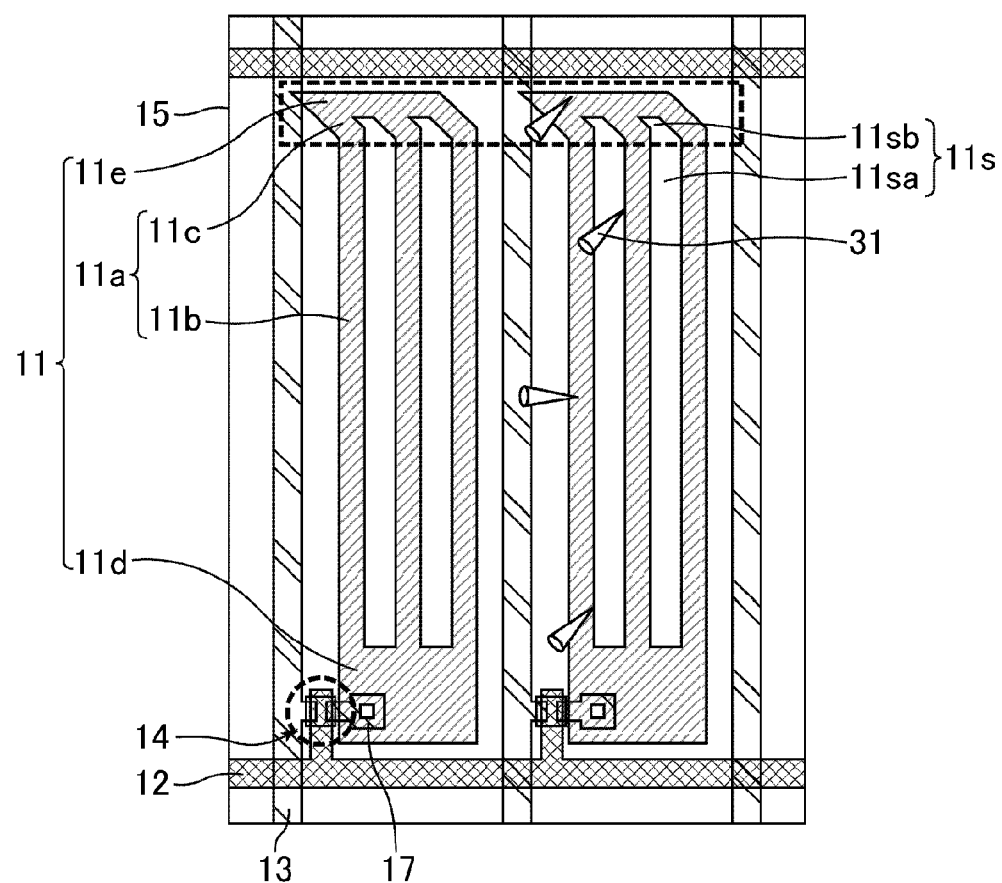
FIG. 5 is a schematic plan view illustrating a pixel structure of a second modified example of the array substrate included in the liquid crystal display device of Embodiment 1.
Figure 6:
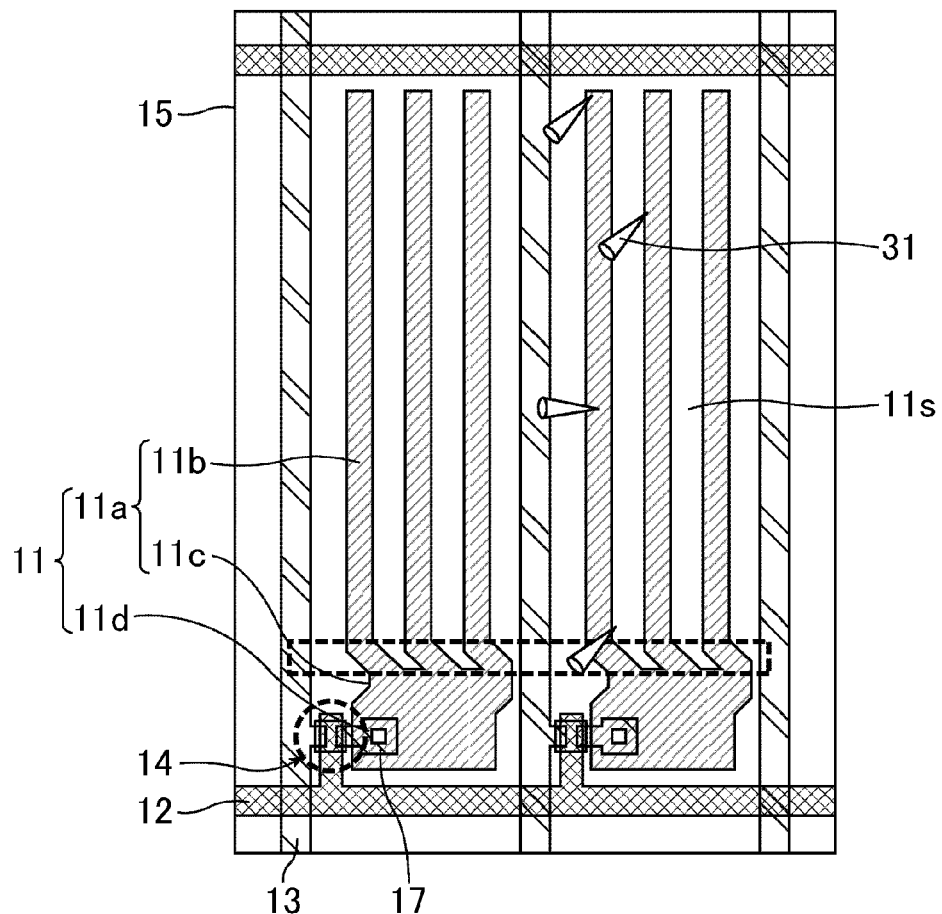
FIG. 6 is a schematic plan view illustrating a pixel structure of the second modified example of the array substrate included in the liquid crystal display device of Embodiment 1.

For a second modified example of the liquid crystal display device of Embodiment 1, as illustrated in FIGS. 5 and 6, the comb-tooth portions 11a of the pixel electrodes include bent portions only on one end side. Even in such an embodiment, fringe electric field can be formed between the pixel electrode 11 and the common electrode 15. Accordingly, the alignment of the liquid crystal molecules 31 is similarly prevented from being significantly disturbed by a pressure applied thereon.

In the following, the constitution elements and production methods thereof are described.

Figure 7:
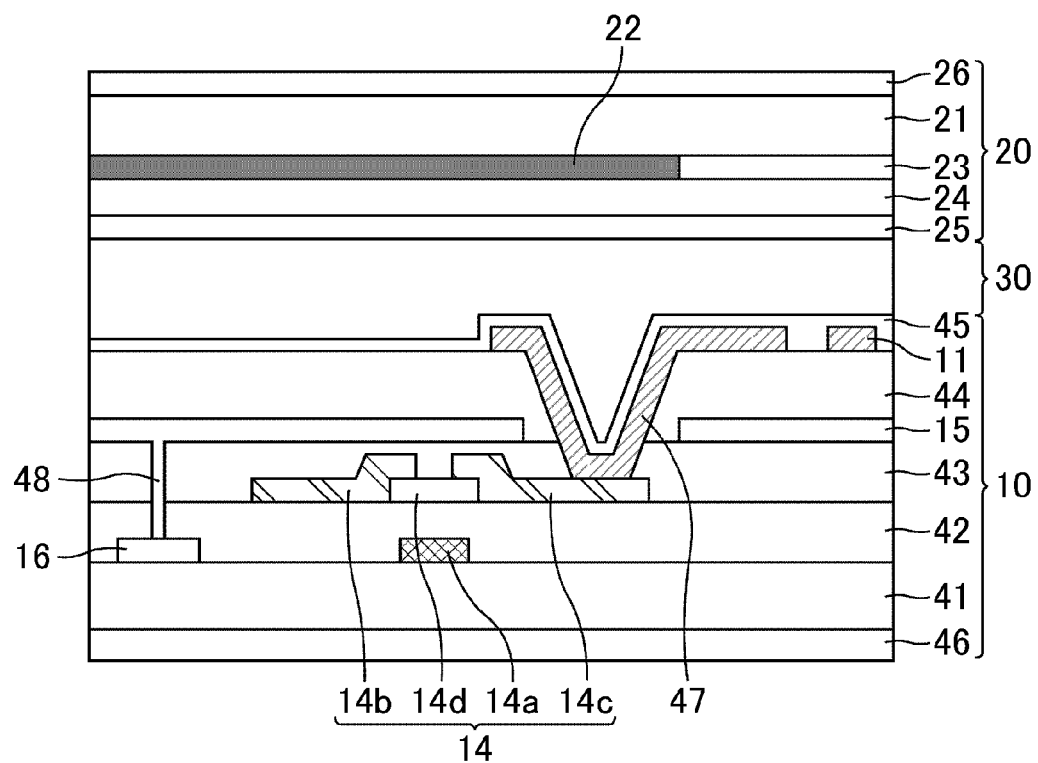
FIG. 7 is a schematic cross-sectional view of the liquid crystal display device of Embodiment 1.

FIG. 7 is a schematic cross-sectional view of the liquid crystal display device of Embodiment 1. A liquid crystal display device of Embodiment 1 includes an array substrate 10, a counter substrate 20, and a liquid crystal layer 30 interposed between the array substrate 10 and the counter substrate 20. The liquid crystal layer 30 contains liquid crystal molecules having positive anisotropy of dielectric pressure, and the liquid crystal molecules are aligned in a direction parallel with the surfaces of the substrates 10 and 20 when no voltage is applied. The array substrate 10 includes: a supporting substrate 41, a TFT 14, a scanning signal line, a data signal line, a common signal line 16, a common electrode 15, a pixel electrode 11; a first insulating film 42, a second insulating film 43, and a third insulating film (interlayer insulating film) 44 each electrically isolating the above wirings or the electrodes; and an alignment film 45. The counter substrate 20 includes a supporting substrate 21, a black matrix 22, a color filter 23, an overcoat (OC) layer 24, and an alignment film 25. The black matrix 22 and the color filter 23 may be provided in the array substrate 10, instead of the counter substrate 20.

The array substrate 10 is formed of a light-transmitting supporting substrate 41 (e.g., glass plate) as a matrix. In the array substrate 10, the TFT 14 includes a gate electrode 14a provided on a principal surface (i.e., surface facing the liquid crystal layer 30) of the supporting substrate 41. The gate electrode 14a is integrally formed with the scanning signal line provided on the supporting substrate 41. The common signal line 16 is similarly provided on the supporting substrate 41. The scanning signal line, the gate electrode 14a, and the common signal line 16 can be formed from the same material by the same process. For example, they may be formed from a conductive material such as molybdenum (Mo), aluminum (Al), tungsten (W), and titanium (Ti). The scanning signal line, the gate electrode 14a, and the common signal line 16 are covered with the first insulating film 42. The first insulating film 42 is also partly provided on the supporting substrate 41. The first insulating film 42 is formed from an inorganic material such as silicon nitride (SiN).

The semiconductor layer 14d is provided on the first insulating film 42 and positioned directly above the gate electrode 14a. The semiconductor layer 14d is provided in a layer above the scanning signal line and the gate electrode 14a. The semiconductor layer 14d can be formed from polysilicon, amorphous silicon, or the like, and is preferably formed from an oxide semiconductor (e.g., IGZO (indium-gallium-zinc-oxygen). Such an oxide semiconductor has higher electron mobility compared to conventional amorphous silicon to enable to make the size of the TFT 14 smaller, so as to be especially suitable to be used for a high-definition liquid crystal display.

In an example illustrated in FIG. 7, the TFT 14 forms a bottom gate-type transistor. The source electrode 14b of the TFT 14 is provided on the first insulating film 42. The source electrode 14b is integrally formed with the data signal line provided on the first insulating film 42. The drain electrode 14c of the TFT 14 is provided on the first insulating film 42. In other words, the data signal line, the source electrode 14b, and the drain electrode 14c are provided in the same layer as the semiconductor layer 14d and are in a layer above the scanning signal line and the gate electrode 14a. The source electrode 14b and the drain electrode 14c are respectively in contact with the semiconductor layer 14d. The data signal line, the source electrode 14b, and the drain electrode 14c can be formed from the same material by the same process. For example, they may be formed from a conductive material such as molybdenum (Mo), aluminum (Al), tungsten (W), and titanium (Ti). The data signal line, the source electrode 14b, and the drain electrode 14c are covered with the second insulating film 43. The second insulating film 43 is formed, for example, from an inorganic material (e.g., silicon nitride (SiN)) or an organic material (e.g., an acrylic resin).

The common electrode 15 is provided on the second insulating film 43. The common electrode 15 is electrically connected to the common signal line 16 through a contact portion 48 penetrating through the first insulating film 42 and the second insulating film 43. In other words, the potential of the common electrode 15 is a common potential. In the common electrode 15, an opening for ensuring a conductive path between the drain electrode 14c and the pixel electrode 11 is provided. The common electrode 15 is, for example, formed from a light-transmitting conductive material (e.g., ITO, IZO). The common electrode 15 is covered with the third insulating film 44. The third insulating film 44 is, for example, formed from an inorganic material (e.g., silicon nitride (SiN)) or an organic material (e.g., an acrylic resin).

The pixel electrode 11 is provided on the third insulating film 44. In other words, the pixel electrode 11 is provided in a layer above the common electrode 15. The pixel electrode 11 faces the pixel electrode 11 through the third insulating film 44 inside the pixel area. In other words, the third insulating film 44 serves as an interlayer insulating film between the pixel electrode 11 and the common electrode 15. The pixel electrode 11 is electrically connected to the drain electrode 14c through a contact portion 47 penetrating through the second insulating film 43 and the third insulating film 44. The pixel electrode 11 is formed from a light-transmitting conductive material (e.g., ITO, IZO) just like the common electrode 15. The pixel electrode 11 includes slits 11s formed in an area facing the common electrode 15. In the array substrate 10, a surface in contact with the liquid crystal layer 30 is formed of the alignment film 45.

The counter substrate 20 is formed of a light-transmitting supporting substrate 21 (e.g., glass plate) as a matrix. The counter substrate 20 is provided with a black matrix 22 for defining pixel areas on a principal surface (i.e., surface facing the liquid crystal layer 30) of the supporting substrate 21. The black matrix 22 is formed in a grid shape in an area facing the wiring portions such as the scanning signal line, the data signal line, and the TFT 14 provided in the array substrate 10. The black matrix 22 is formed, for example, from a black-colored resin material or a light-shielding metallic material (e.g., chromium (Cr)).

Especially in a color display-type liquid crystal display device, the counter substrate 20 is provided with a color filter 23 in an area surrounded by the black matrix 22. The color filter 23 is provided on the supporting substrate 42 and may be partly provided on the black matrix 22. The color filter 23 is formed of differently colored resins (e.g., red, green, and blue). Areas corresponding to a red resin, a green resin, and a blue resin respectively form a red pixel, a green pixel, and a blue pixel.

In a liquid crystal mode utilizing a fringe electric field such as Embodiment 1, a surface of the counter substrate 20 in contact with the liquid crystal layer 30 is preferably flat. The counter substrate 20 preferably further includes the overcoat (OC) layer 24 that is comparatively thick for planarizing irregularities on the surface on the liquid crystal layer 30 side of the color filter 23. The surface of the counter substrate 20 in contact with the liquid crystal layer 30 is formed of the alignment film 25. The alignment films 25 and 45 are, for example, formed from an organic material (e.g., polyimide) or an inorganic material (e.g., polysiloxane).

The array substrate 10 and the counter substrate 20 are arranged in such a manner that the principal surfaces thereof face each other. Between the array substrate 10 and the counter substrate 20, for example, pillar-shaped spacers (not illustrated) integrally formed with one substrate from a resin material are provided, thereby forming a predetermined gap. The array substrate 10 and the counter substrate 20 are bonded to each other by a sealing material (not illustrated) in a state where a predetermined gap is formed therebetween.

The liquid crystal layer 30 is formed of a liquid crystal composition that contains the liquid crystal molecules 31 having positive anisotropy of dielectric constant and is enclosed in the gap between the array substrate 10 and the counter substrate 20.

An alignment treatment such as rubbing and photoalignment is performed on the alignment films 25 and 45 so that the alignment of the liquid crystal molecules contained in the liquid crystal layer 30 is controlled. In other words, the liquid crystal molecules are uniformly aligned by the controlling force by the alignment films 25 and 45. The orientation by the alignment films 25 and 45 is preferably, for example, inclined 0° to 7° relative to the major axis orientation of the straight portion of the pixel electrode 11.

In a transmission- or transflective-type liquid crystal display device, moreover, a lighting unit provided on the rear side of the array substrate 10, namely, a back light unit is provided. An exemplary back light unit utilizes, as a light source, a light emitting diode (LED) or a cold-cathode tube (CCFL).

To one outer surface (surface opposite to the liquid crystal layer 30 side of the array substrate 10) of the supporting substrate 41, a polarizing plate 46 is attached. Moreover, a polarizing plate 26 is attached to the other outer surface (surface opposite to the liquid crystal layer 30 side of the counter substrate 20) of the supporting substrate 21.

The polarizing plates 26 and 46 each contain a polarizer, and a normally black mode is realized in which the liquid crystal display device has the lowest transmittance (i.e., black screen display), for example, in a state where there is no potential difference between the common electrode 15 and the pixel electrode 11 (i.e., no electric field is formed between the common electrode 15 and the pixel electrode 11). The polarizing plates 26 and 46 each may contain, in addition to the polarizer, a retardation film that provides a predetermined phase difference value to the light from the back light unit. The polarizing plates 26 and 46 each may contain a protective film for protecting one surface or both surfaces of the polarizer.

Specifically, in the liquid crystal display device of Embodiment 1, the liquid crystal molecules 31 are aligned in such a manner that the major axis thereof is in parallel with the orientation of alignment by the alignment films 25 and 45 when no voltage is applied. In such a state, the light emitted from the back light unit passes through the liquid crystal display device, after passing through the polarizing plate 46 on the array substrate 10 side, and is absorbed by the polarizing plate 26 on the counter substrate 20 side (black screen display).

In contrast, in a state where different potentials are supplied (i.e., an electric field is formed) between the common electrode 15 and the pixel electrode 11, a fringe electric field is formed between the common electrode 15 and the pixel electrode 11. The fringe electric field is mainly formed orthogonally to the major axis orientation of the slits 11s. The alignment state of the liquid crystal molecules 31 is changed in such a manner that the major axis orientation thereof is turned from the orientation of alignment to an orientation in parallel with the direction of the fringe electric field. When the major axis orientation of the liquid crystal molecules 31 is thus rotated from the orientation of alignment, the modulation rate of light transmitting the liquid crystal layer 30 is changed. Accordingly, part of the light emitted from the back light unit and having passed through the liquid crystal display device passes through the polarizing plate 26 (white screen display). In other words, the transmittance of the liquid crystal display device varies in accordance with the magnitude of the electric field. In the liquid crystal mode utilizing the fringe electric field, the light from the back light unit is selectively transmitted, thereby displaying the image.

Subsequently mounting a gate driver, a source driver, a display controlling circuit (controller), and the like completes a liquid crystal display device corresponding to the purpose.

The structure of the liquid crystal display device of Embodiment 1 can be confirmed by, for example, a scanning electron microscope.

Embodiment 2

A liquid crystal display device of Embodiment 2 is the same as that of Embodiment 1, except that the shape of the pixel electrode is different.

Figure 8:
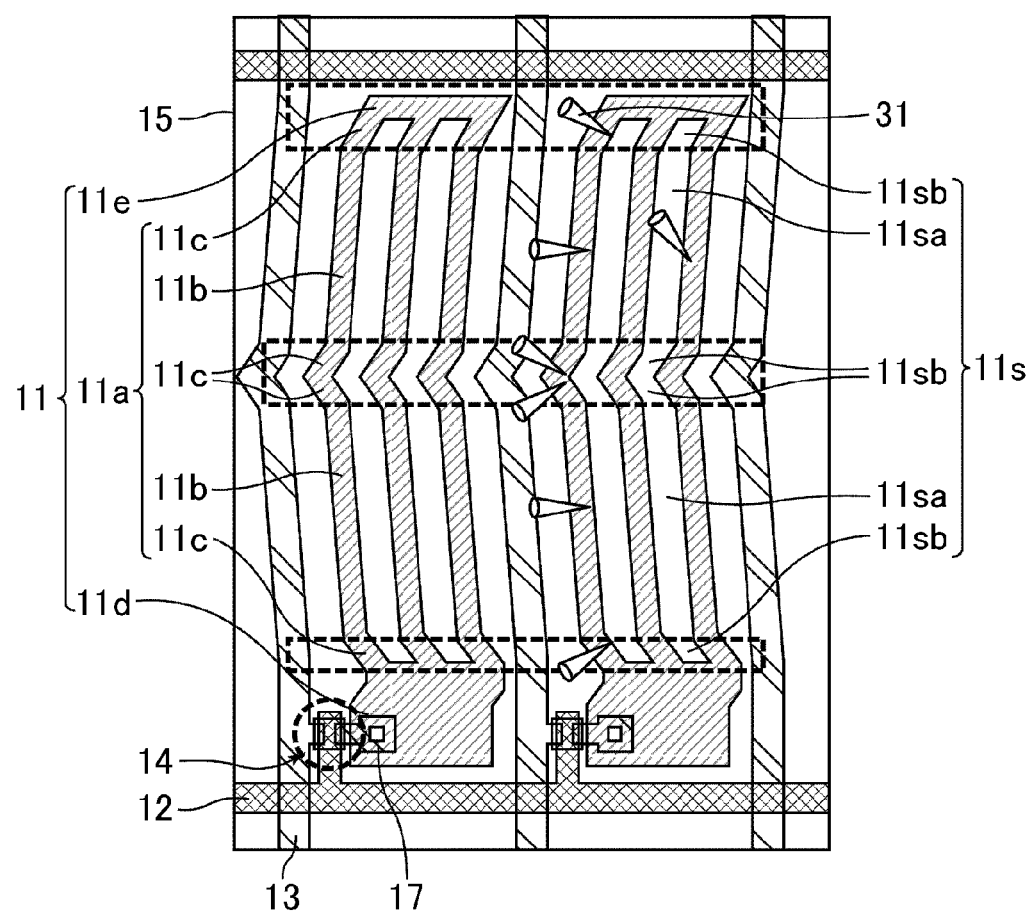
FIG. 8 is a schematic plan view illustrating a pixel structure of an array substrate included in a liquid crystal display device of Embodiment 2.

FIG. 8 is a schematic plan view illustrating a pixel structure of an array substrate included in a liquid crystal display device of Embodiment 2. Scanning signal lines 12 and data signal lines 13 are arranged to cross each other and to surround a pixel electrode 11. In the vicinity of each intersection of the scanning signal lines 12 and the data signal lines 13, a TFT (thin film transistor) 14 is provided. The data signal lines 13 are extending in an orientation inclined several degrees to the 90° direction relative to the extending orientation of the scanning signal lines.

The pixel electrode 11 includes comb-tooth portions 11a. The comb-tooth portions 11a include straight portions 11b in parallel with the lengthwise direction of the data signal lines 13 and bent portions 11c extending at a predetermined angle relative to the lengthwise direction of the straight portions 11b. The bent portions 11c are formed at both ends and at the center of each comb-tooth portion 11a. At the center of each comb-tooth portion 11a, two bent portions 11c extending at predetermined different angles from each other are formed. In Embodiment 2, each comb-tooth portion 11a includes two straight portions 11b, and each straight portion 11b is sandwiched by two bent portions 11c. In addition, respective straight portions 11b are extending at a certain angle to each other. Each comb-tooth portion 11a therefore has a structure symmetrical to an axis bisecting the comb-tooth portion 11a, so that the alignment balance of the liquid crystal molecules 31 can be adjusted. This configuration makes the slits 11s formed in the pixel electrode 11 also include straight portions 11sa in parallel with the lengthwise direction of the data signal lines 13 and bent portions 11sb extending at a predetermined angle relative to the lengthwise direction of the straight portions 11sa. The number of slits 11s is not particularly limited.

In Embodiment 2, at positions overlapping with the bent portions 11c and the straight portions 11e of the pixel electrode, a thinner insulating film (first interlayer insulating film) is formed, and at positions overlapping with the straight portions 11b of the pixel electrode, a thicker insulating film (second interlayer insulating film) is formed. With this configuration, even when the alignment controlling force by an electric field in a direction orthogonal to the major axis orientation of the bent portions 11c of the pixel electrode is enhanced, the alignment of the liquid crystal molecules 31 is prevented from being significantly disturbed even under application of a pressure. The first and second interlayer insulating films in Embodiment 2 have the same thickness and are made of the same material as those in Embodiment 1.

As in Embodiment 2, by increasing the number of bent portions per pixel electrode and reducing the thickness of the interlayer insulating film at a position overlapping with each bent portion compared to the interlayer insulating film at a position overlapping with the straight portion of the pixel electrode, an area where the alignment of the liquid crystal molecules 31 is disturbed is further reduced and the possibility of occurrence of trace unevenness is further reduced. Moreover, forming such bent portions in the vicinity of the center of the pixel enables to prevent alignment disturbance of the liquid crystal molecules 31 in a wider area.

Embodiment 3

A liquid crystal display device of Embodiment 3 is the same as that of Embodiment 1, except that the shape and the area of the pixel electrode are different. A single pixel electrode in Embodiment 3 is smaller in area than the single pixel electrode in Embodiment 1 and includes a larger number of TFTs.

Figure 9:
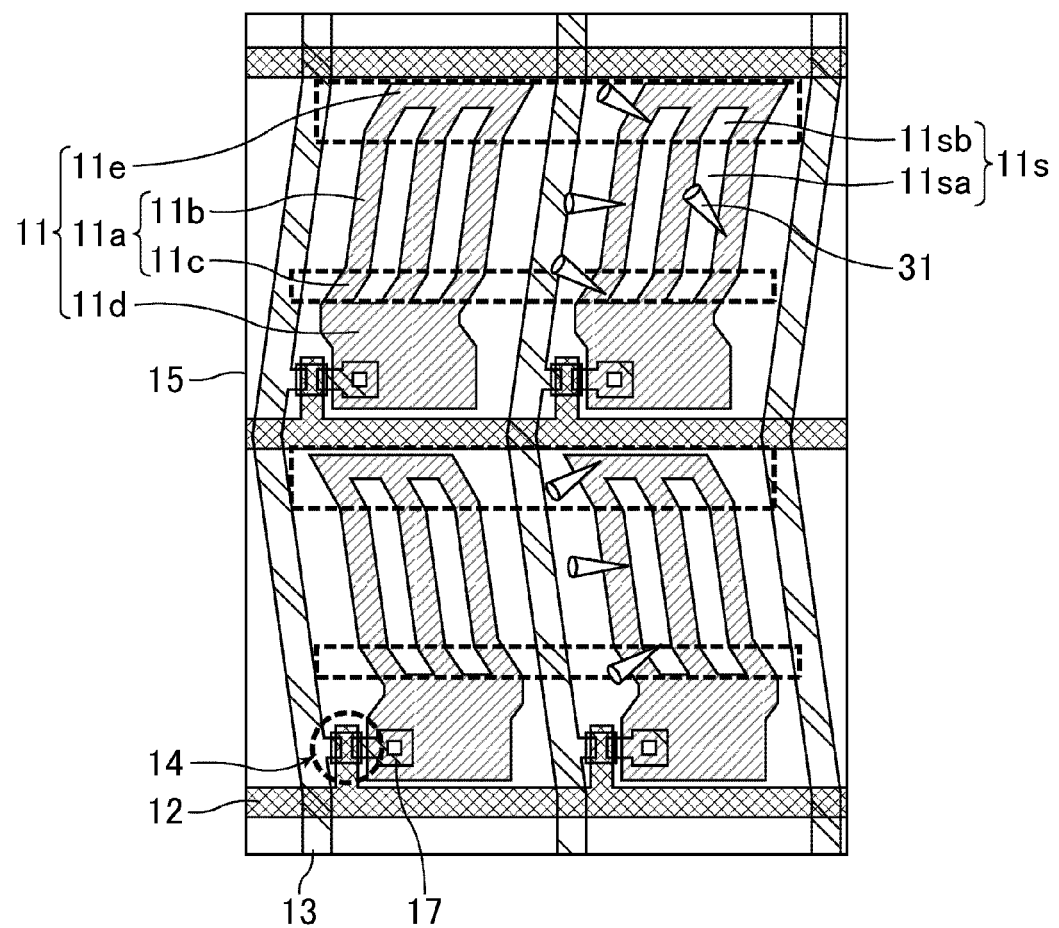
FIG. 9 is a schematic plan view illustrating a pixel structure of an array substrate included in a liquid crystal display device of Embodiment 3.

FIG. 9 is a schematic plan view illustrating a pixel structure of an array substrate included in a liquid crystal display device of Embodiment 3. As illustrated in FIG. 9, scanning signal lines 12 and data signal lines 13 are provided to cross each other and to surround a pixel electrode 11. In the vicinity of each intersection of the scanning signal lines 12 and the data signal lines 13, a TFT (thin film transistor) 14 is provided. The data signal lines 13 are extending in an orientation inclined several degrees to the 90° direction relative to the extending orientation of the scanning signal lines 12.

The pixel electrode 11 includes comb-tooth portions 11a, and each comb-tooth portion 11a includes a straight portion 11b in parallel with the lengthwise direction of the data signal lines 13 and bent portions 11c extending at a predetermined angle relative to the lengthwise direction of the straight portion 11b. In other words, the pixel electrode 11 includes the straight portion 11b in parallel with the lengthwise direction of the data signal lines 13 and the bent portions 11c extending at a predetermined angle relative to the lengthwise direction of the straight portion 11b. This configuration makes each slit 11s formed in the pixel electrode 11 include a straight portion 11sa in parallel with the lengthwise direction of the data signal lines 13 and bent portions 11sb extending at a predetermined angle relative to the lengthwise direction of the straight portion 11sa. The number of slits 11s is not particularly limited.

In Embodiment 3, the data signal lines 13 include a bent point at each boundary between the pixel areas adjacent to each other in the longitudinal direction and have a symmetrical shape to the scanning signal line 12. The pixel electrode 11 is provided in each of pixel areas adjacent to each other in the column direction with the scanning signal line 12 provided therebetween. These pixel electrodes 11 and each of the comb-tooth portions 11a, the straight portions 11b, and the bent portions 11c included in the pixel electrodes are symmetrical to one another to the line orthogonal to the scanning signal line 12. This configuration enables to adjust the balance of the alignment of the liquid crystal molecules 31.

In Embodiment 3, at positions overlapping with the bent portions 11c and the straight portions 11e of the pixel electrode, a thinner insulating film (first interlayer insulating film) is formed, and at a position overlapping with the straight portions 11b of the pixel electrode, a thicker insulating film (second interlayer insulating film) is formed. With this configuration, since the alignment controlling force by an electric field in a direction orthogonal to the major axis orientation of the bent portions 11c of the pixel electrode is enhanced, the alignment of the liquid crystal molecules 31 is prevented from being significantly disturbed even under application of a pressure. The first and second interlayer insulating films in Embodiment 3 have the same thickness and are made of the same material as those in Embodiment 1.

Embodiment 4

A liquid crystal display device of Embodiment 4 is the same as that in Embodiment 1, except that the shape of the comb-tooth portions of the pixel electrode is required to satisfy predetermined conditions and that the thickness of the interlayer insulating film at positions overlapping with the bent portions of the comb-tooth portion in the pixel electrode is the same as the thickness of the interlayer insulating film at a position overlapping with the straight portion of the comb-tooth portion in the pixel electrode.

Figure 10:
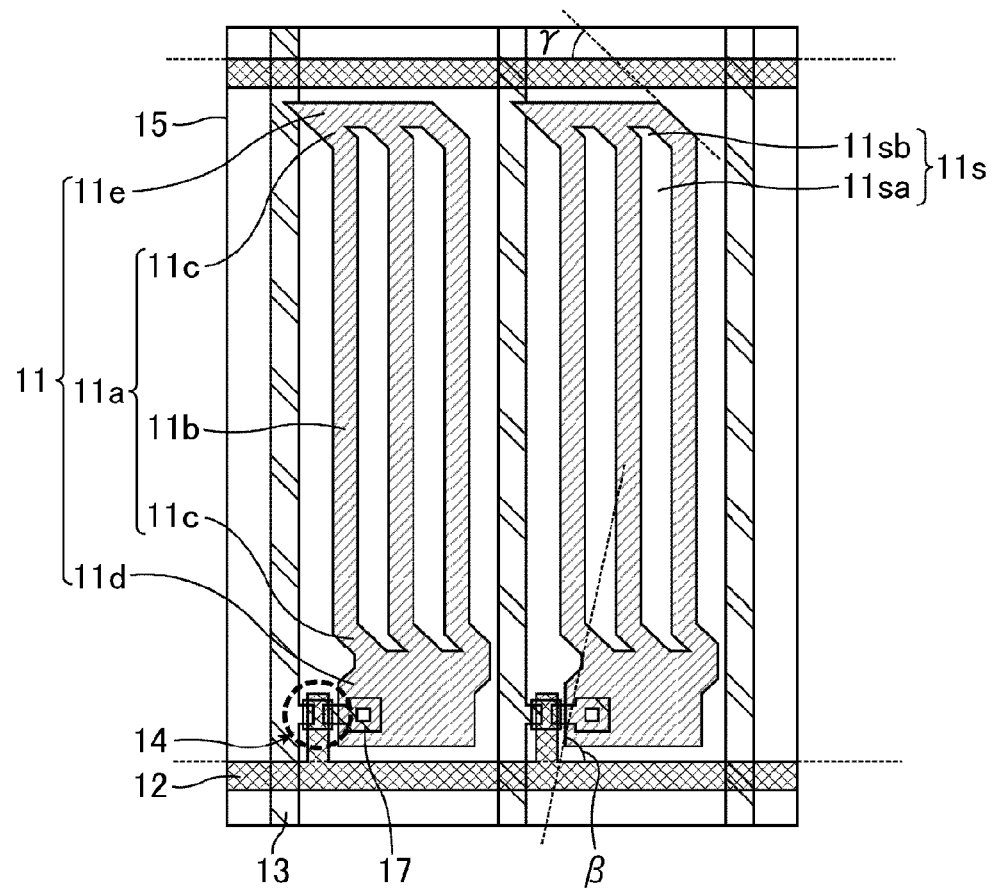
FIG. 10 is a schematic plan view illustrating a pixel structure of an array substrate included in a liquid crystal display device of Embodiment 4.

FIG. 10 is a schematic plan view illustrating a pixel structure of an array substrate included in a liquid crystal display device of Embodiment 4. As illustrated in FIG. 10, scanning signal lines 12 and data signal lines 13 are provided to cross each other and to surround a pixel electrode 11. In the vicinity of each intersection of the scanning signal lines 12 and the data signal lines 13, a TFT (thin film transistor) 14 is provided. The data signal lines 13 are extending in an orientation inclined several degrees relative to the 90° direction relative to the extending orientation of the scanning signal lines.

In Embodiment 4, an angle γ formed between the major axis orientation of bent portions 11c of the pixel electrode and the extending orientation of the scanning signal lines 12 and an angle β formed between the orientation of alignment and the scanning signal lines satisfy a relationship of $(135-\beta)°<\gamma<90°$. More preferably, the angles satisfy a relationship of $50°<\gamma<60°$. If the angle γ is smaller than 50°, lowering of the transmittance tends to be significant. If the angle γ is more than 60°, the effect of reducing trace unevenness tends to be lowered.

Even in a case where the thickness of the interlayer insulating film is not changed from area to area as in Embodiments 1 to 3, if the above relationship is satisfied, an area where the alignment of the liquid crystal molecules is disturbed is reduced and the possibility of trace unevenness is reduced even under application of a pressure.

Embodiment 5

In Embodiment 5, the interlayer insulating film at a position between adjacent pixel electrodes provided side by side with a scanning signal line or a data signal line therebetween is thicker than the interlayer insulating film at a position overlapping with the pixel electrode. The other features are the same as those in Embodiments 1 to 4.

Figure 11:
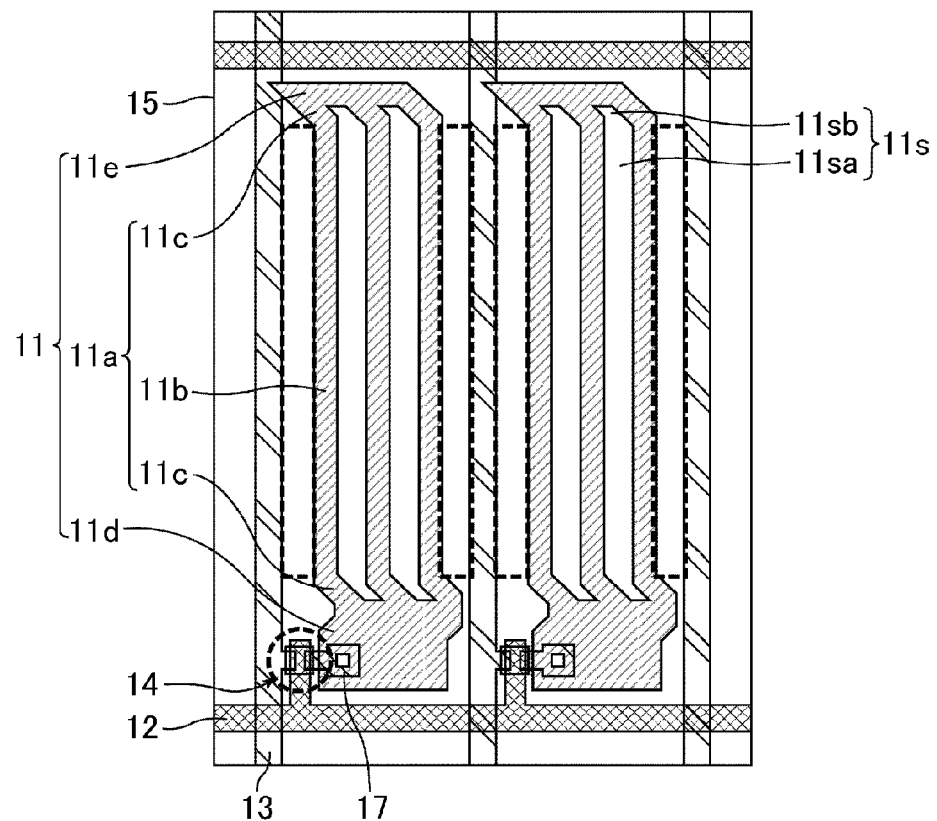
FIG. 11 is a schematic plan view illustrating a pixel structure of an array substrate included in a liquid crystal display device of Embodiment 5.

FIG. 11 is a schematic plan view illustrating a pixel structure of an array substrate included in a liquid crystal display device of Embodiment 5. As illustrated in FIG. 11, in a plan view of an array substrate in Embodiment 1, scanning signal lines 12 and data signal lines 13 are provided to cross each other and to surround a pixel electrode 11. In the vicinity of each intersection between the scanning signal lines 12 and the data signal lines 13, a TFT (thin film transistor) 14 is provided. The scanning signal lines 12 and the data signal lines 13 are extending to cross each other orthogonally. In FIG. 11, areas surrounded by dotted lines indicate areas where the interlayer insulating film is thick. FIG. 11 illustrates a case where the interlayer insulating film between pixel electrodes 11 provided side by side with the data signal line 13 therebetween is thick. Alternatively, the interlayer insulating film between pixel electrodes provided side by side with the scanning signal line 12 therebetween may be thick.

Figure 12:
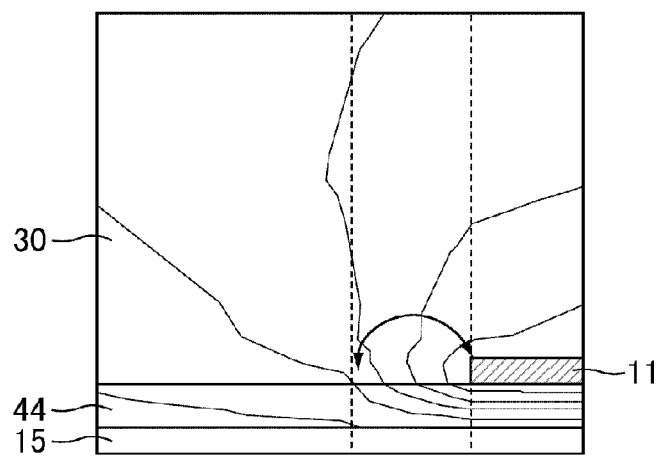
FIG. 12 is a schematic cross-sectional view illustrating in detail a vicinity of a comb-tooth portion of a pixel electrode in Embodiment 5 and illustrates a vicinity of a comb-tooth portion positioned at an inner side.
Figure 13:
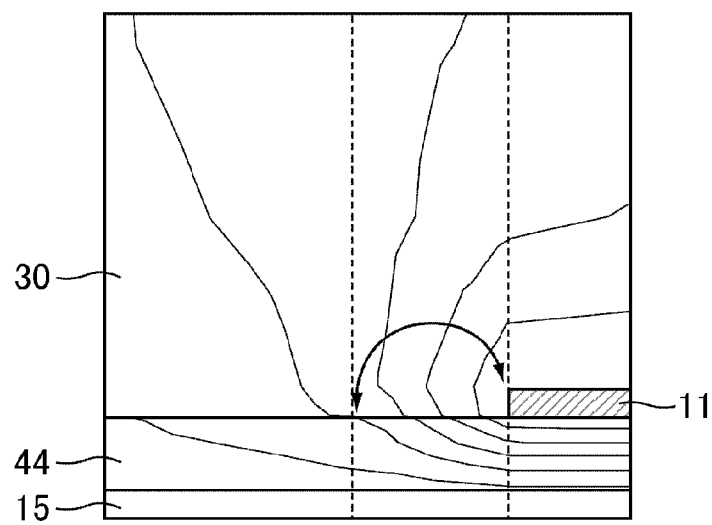
FIG. 13 is a schematic cross-sectional view illustrating in detail a vicinity of the comb-tooth portion of the pixel electrode in Embodiment 5 and illustrates a vicinity of a comb-tooth portion positioned at an outermost side.

FIGS. 12 and 13 each are a schematic cross-sectional view illustrating in detail a vicinity of a comb-tooth portion of a pixel electrode in Embodiment 5. FIG. 12 illustrates a vicinity of a comb-tooth portion positioned at an inner side and FIG. 13 illustrates a vicinity of a comb-tooth portion positioned at an outermost side. In the liquid crystal display device of Embodiment 5, a common electrode 15, an interlayer insulating film 44, and a pixel electrode 11 are stacked in the stated order toward a liquid crystal layer 30. As illustrated in FIGS. 12 and 13, the interlayer insulating film 44 (hereafter, also referred to as a third interlayer insulating film) between pixel electrodes 11 provided side by side with the scanning signal line 12 or the data signal line 13 therebetween is thicker than the interlayer insulating film 44 (hereafter, also refers to as a fourth interlayer insulating film) overlapping with the comb-tooth portions of the pixel electrode 11. Comparison between FIG. 12 and FIG. 13 clarifies that equipotential lines in the vicinity of the comb-tooth portions at an outermost side of the pixel electrode 11 is sparse and the magnitude of the electric field is smaller than those in the vicinity of the comb-tooth portions at an inner side. For example, in a case where a system that potentials having different polarity are respectively supplied to adjacent pixel electrodes 11 (e.g., dot inversion driving system) is employed, the liquid crystal molecules 31 between the pixel electrodes are influenced by a great potential difference of positive and negative potentials, so as to be easily aligned in a direction orthogonal to the extending orientation of the data signal lines 13. Arrangements as described above enhances the alignment controlling force by an electric field in the vicinity of the outer side of the comb-tooth portions of the pixel electrode 11, so that the alignment of the liquid crystals is less likely to be disturbed even under application of a pressure.

For one example, when the interlayer insulating film has a relative dielectric constant $\in$ of 6.0 and the thickness of the fourth interlayer insulating film is 0.2 μm, the third interlayer insulating film preferably has a thickness of 0.25 to 0.3 μm. If the thickness of the third interlayer insulating film is less than 0.25 μm, the effect of reducing the trace unevenness is likely to be lowered. If the thickness is more than 0.3 μm, lowering of the transmittance may be significant.

As above, descriptions have been given on the liquid crystal display device of the present invention in Embodiments 1 to 5. Respective embodiments and modified examples thereof may be employed in an appropriate combination.

Comparative Embodiment 1

Figure 14:
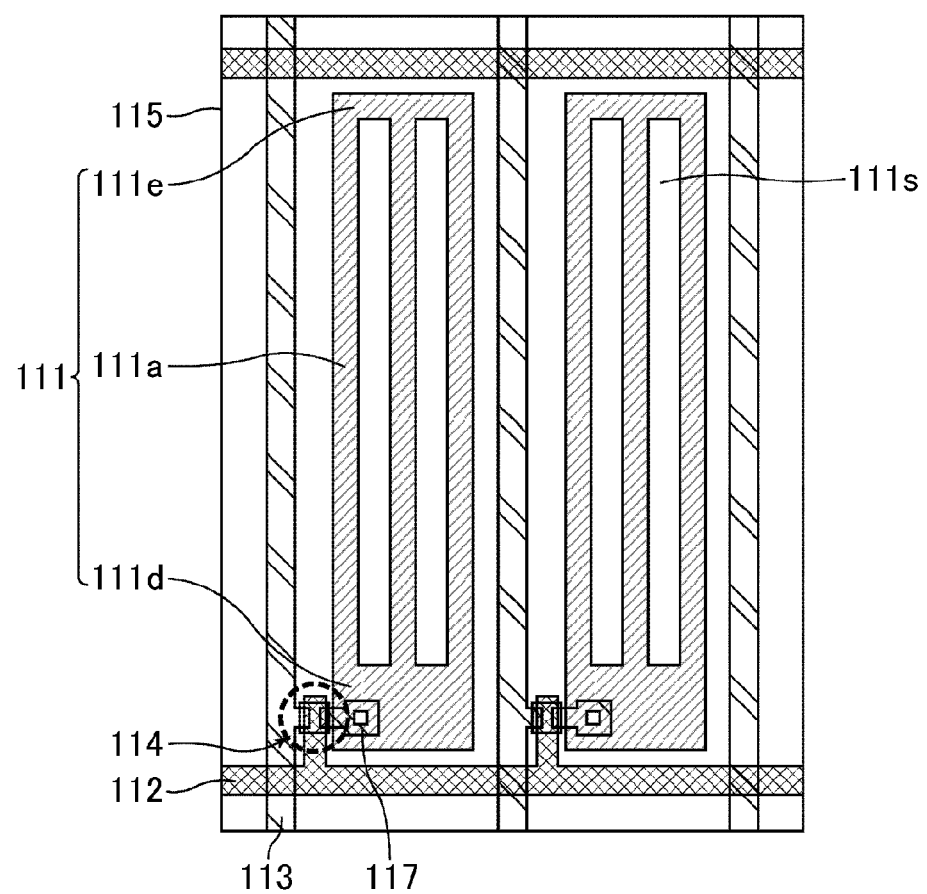
FIG. 14 is a schematic plan view illustrating a pixel structure of an array substrate included in a liquid crystal display device of Comparative Embodiment 1.
Figure 15:
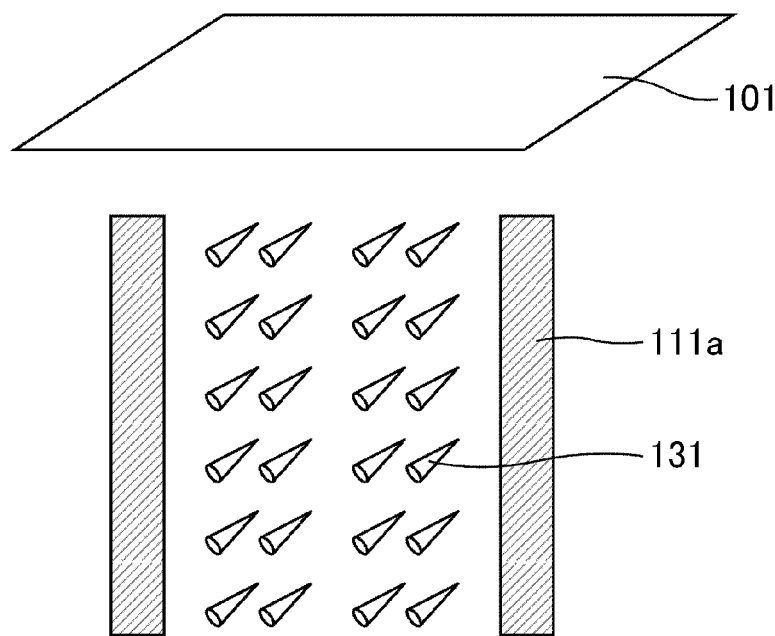
FIG. 15 is a schematic view illustrating behaviors of liquid crystal molecules when a pressure is applied to a display screen of a conventional FFS-mode liquid crystal display device.
Figure 16:
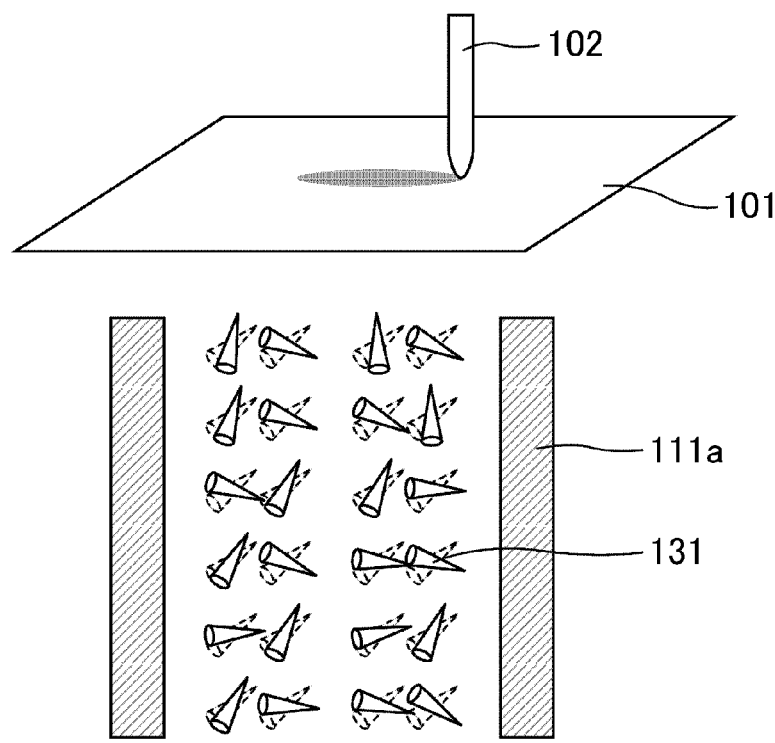
FIG. 16 is a schematic view illustrating behaviors of the liquid crystal molecules when a pressure is applied to the display screen of the conventional FFS-mode liquid crystal display device.
Figure 17:
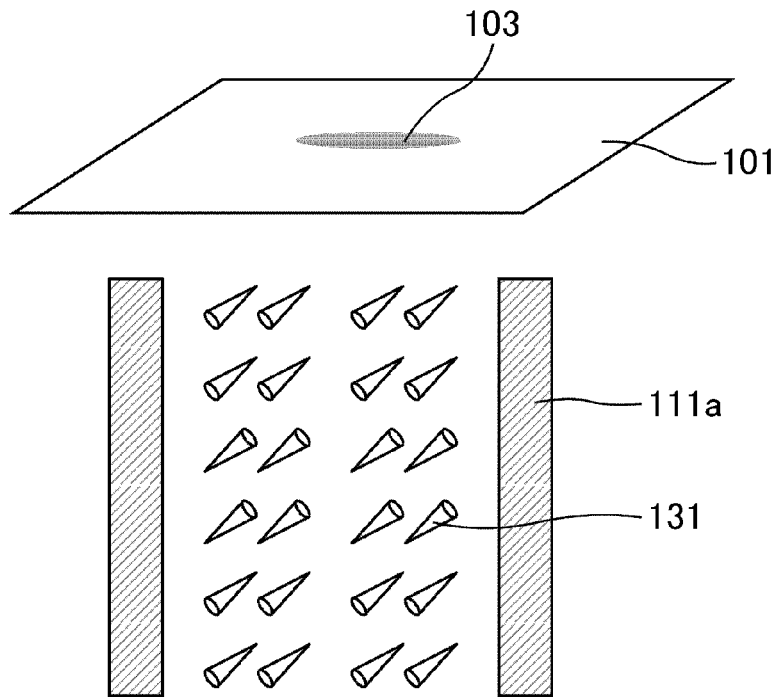
FIG. 17 is a schematic view illustrating behaviors of the liquid crystal molecules when a pressure is applied to the display screen of the conventional FFS-mode liquid crystal display device.
Figure 18:
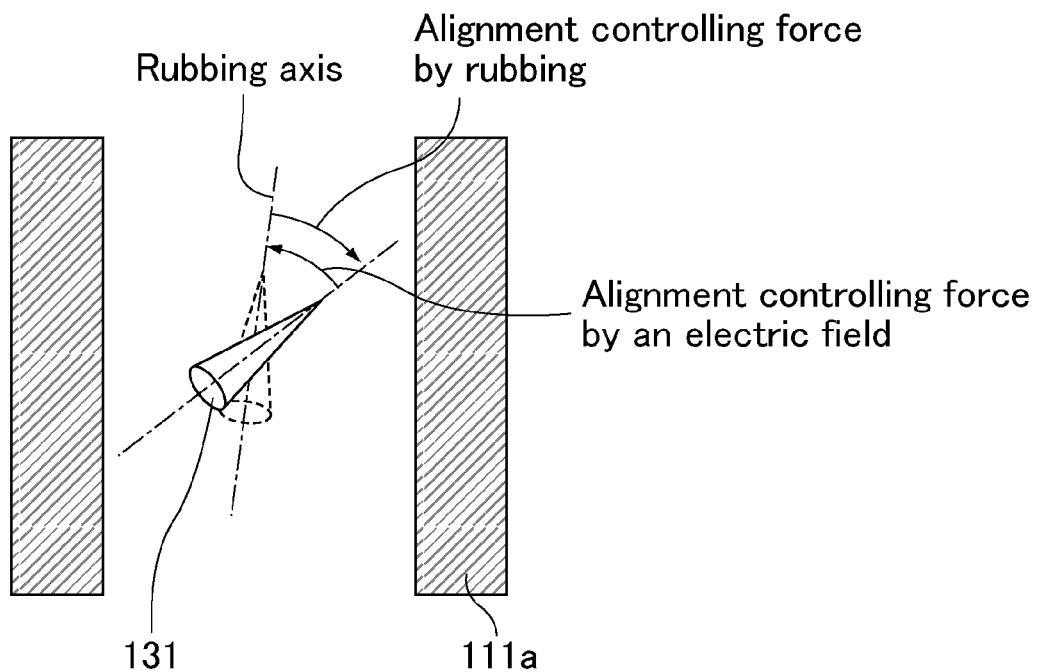
FIG. 18 is a schematic plan view illustrating a part of pixels of the conventional FFS-mode liquid crystal display device and illustrates a state where a voltage of 4.4 V is applied to a liquid crystal layer.
Figure 19:
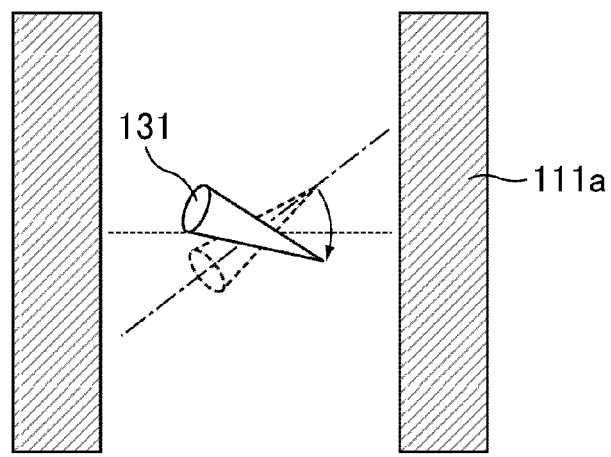
FIG. 19 is a schematic plan view illustrating a part of the pixels of the conventional FFS-mode liquid crystal display device and illustrates a state where a voltage of 4.4 V is applied to the liquid crystal layer.
Figure 20:
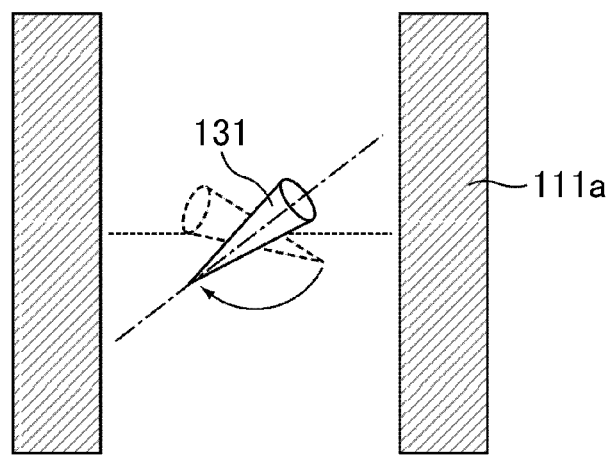
FIG. 20 is a schematic plan view illustrating a part of the pixels of the conventional FFS-mode liquid crystal display device and illustrates a state where a voltage of 4.4 V is applied to the liquid crystal layer.
Figure 21:
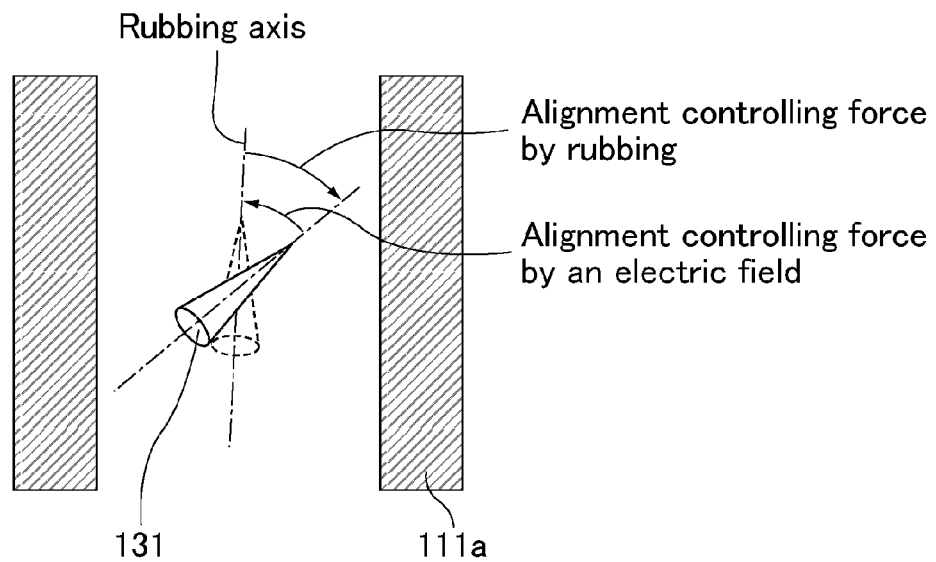
FIG. 21 is a schematic plan view illustrating a part of the pixels of the conventional FFS-mode liquid crystal display device and illustrates a state where a voltage of 4.0 V is applied to the liquid crystal layer.
Figure 22:
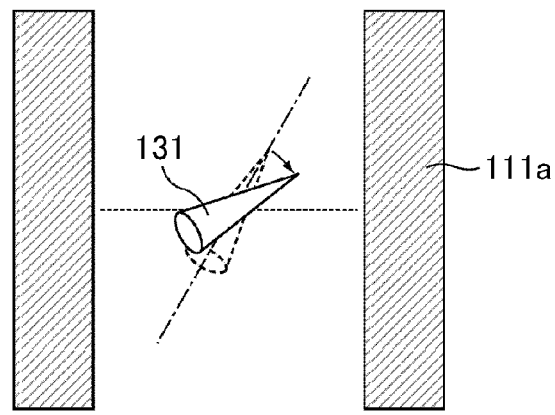
FIG. 22 is a schematic plan view illustrating a part of the pixels of the conventional FFS-mode liquid crystal display device and illustrates a state where a voltage of 4.0 V is applied to the liquid crystal layer.
Figure 23:
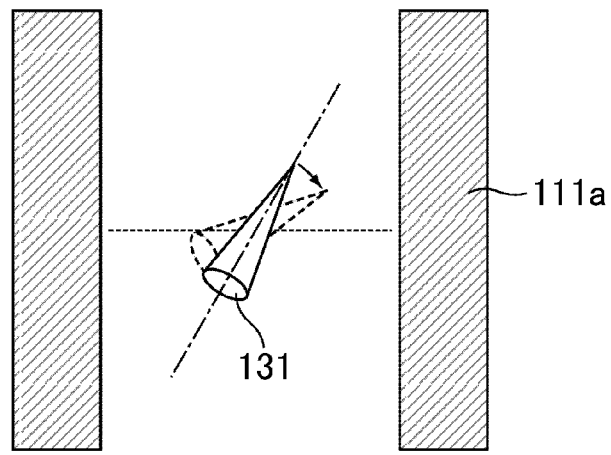
FIG. 23 is a schematic plan view illustrating a part of the pixels of the conventional FFS-mode liquid crystal display device and illustrates a state where a voltage of 4.0 V is applied to the liquid crystal layer.
Figure 24:
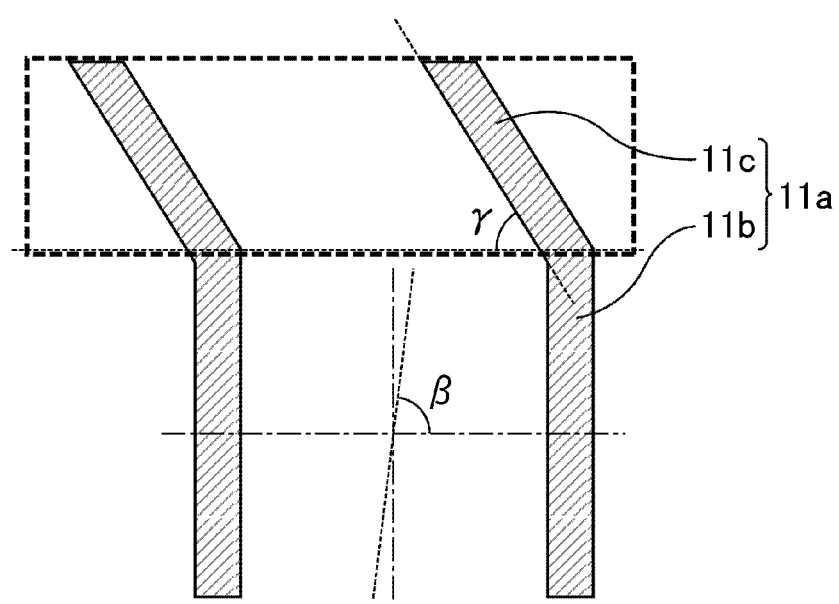
FIG. 24 is a schematic plane view illustrating a vicinity of ends of comb-tooth portions of an electrode in an FFS-mode liquid crystal display device of the present invention.
Figure 25:
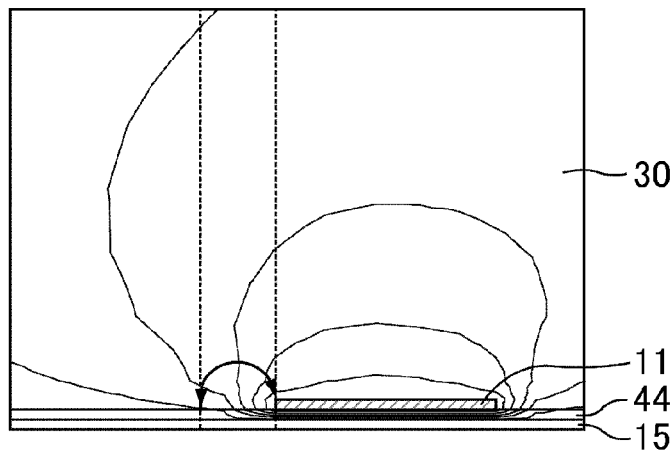
FIG. 25 is a schematic cross-sectional view illustrating an example of generation of an electric field in the vicinity of a comb-tooth portion of the electrode in the FFS-mode liquid crystal display device of the present invention and illustrates an electric field in the vicinity of a bent portion of the comb-tooth portion of a pixel electrode.
Figure 26:
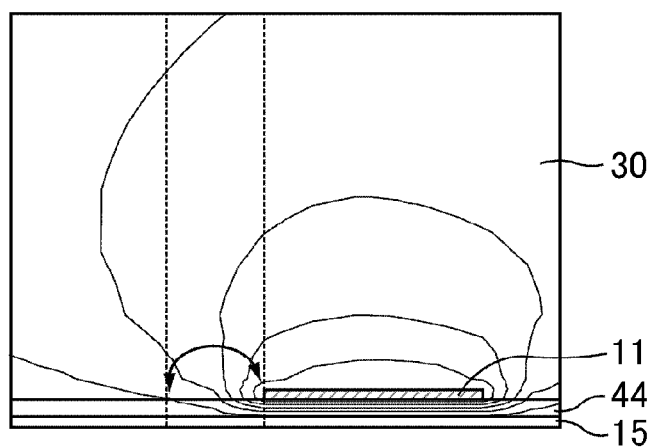
FIG. 26 is a schematic cross-sectional view illustrating an example of generation of an electric field in the vicinity of the comb-tooth portion of the electrode in the FFS-mode liquid crystal display device of the present invention and illustrates an electric field in the vicinity of a straight portion of the comb-tooth portion of the pixel electrode.
Figure 27:
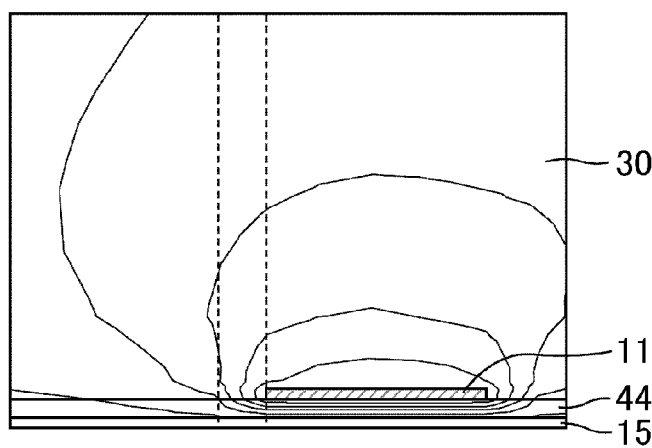
FIG. 27 is a schematic cross-sectional view illustrating a vicinity of the comb-tooth portions of the pixel electrode in the FFS-mode liquid crystal display device of the present invention and illustrates a vicinity of the comb-tooth portions positioned at an inner side.
Figure 28:
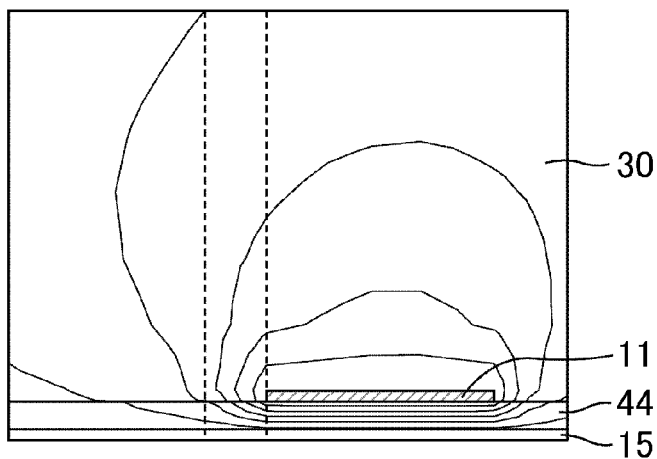
FIG. 28 is a schematic cross-sectional view illustrating the vicinity of the comb-tooth portions of the pixel electrode in the FFS-mode liquid crystal display device of the present invention and illustrates a vicinity of the comb-tooth portions positioned at an outermost side.
Figure 29:
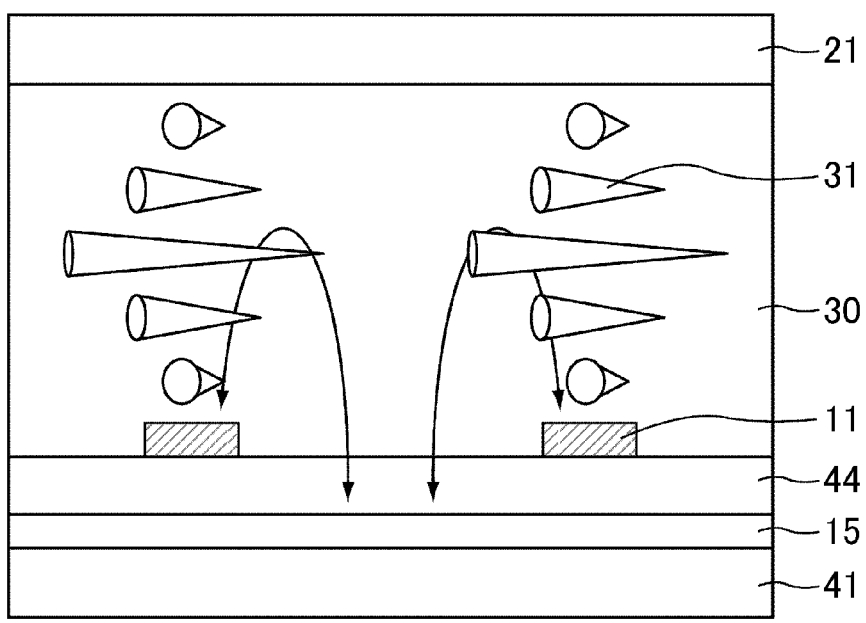
FIG. 29 is a schematic cross-sectional view illustrating a state of formation of an electric field and alignment of liquid crystals in an FFS-mode liquid crystal display device.

In the following, a description is given on one example of a conventional FFS-mode liquid crystal display device. FIG. 14 is a schematic plan view illustrating a pixel structure of an array substrate included in a liquid crystal display device of Comparative Embodiment 1. Scanning signal lines 112 and data signal lines 113 are arranged to cross each other and to surround a pixel electrode 111. In the vicinity of each intersection between the scanning signal lines 112 and the data signal lines 113, a TFT (thin film transistor) 114 is provided. The scanning signal lines 112 and the data signal lines 113 are extending to cross each other orthogonally. Each slit 111s includes only a straight portion in parallel with the lengthwise direction of the data signal lines 113, not including a bent portion.

Evaluation Test

Difference in the trace unevenness was observed among a sample of Example 1 actually produced in accordance with Embodiment 4, a sample of Example 2 actually produced in accordance with Embodiment 1, a sample of Example 3 actually produced in accordance with Embodiment 5, and a sample actually produced in accordance with Comparative Embodiment 1.

In production of each sample, the following conditions were satisfied. The thickness of the liquid crystal layer was set to 3.4 μm. A liquid crystal material used had an anisotropy of dielectric constant Δ$\in$ of 7.0 and a refractive index anisotropy Δn of 0.105. The interlayer insulating film between the pixel electrode and the common electrode has a standard thickness of 0.2 μm. The thickness in an "area where (the film) is thinner" in Example 2 was set to 0.1 μm. The thickness in an "area where (the film) is thicker" in Example 3 was set to 0.3 μm. An insulating film material used had a relative dielectric constant $\in$ of 6.0.

The evaluation was performed by the following three steps. First, the mode of a display screen was set to a white display state (V255) (step 1). Next, a load of about 150 to 250 g was applied in a vertical direction with a pointed stick (e.g., ball-point pen) having a tip diameter of about 0.3 to 0.5 mm (step 2). Then, whether or not the mark of the tracing disappears was observed visually (step 3). Table 1 below shows a relationship between each sample and a voltage (V) applied to liquid crystals. In Table 1, "O" indicates no trace unevenness, "Δ" indicates slight trace unevenness, and "X" indicates distinct trace unevenness.

TABLE 1

| Sample | Voltage applied to liquid crystal (V) | | |
|---|---|---|---|
| | 4.0 | 4.2 | 4.4 |
| Comparative Example 1 | X | X | X |
| Example 1 | O | Δ | X |
| Example 2 | O | O | O |
| Example 3 | O | O | O |

As above, according to the embodiments of the present invention, trace unevenness is significantly reduced compared to conventional embodiments.

REFERENCE SIGNS LIST

10: Array substrate
11, 111: Pixel electrode
11a, 111a: Comb-tooth portion
11b: Straight portion
11c: Bent portion
11d, 111d: Wide portion
11e, 111e: Straight portion
11s, 111s: Slit
11sa: Straight portion
11sb: Bent portion
12, 112: Scanning signal line
13, 113: Data signal line
14, 114: TFT
14a: Gate electrode
14b: Source electrode
14c: Drain electrode
14d: Semiconductor layer
15, 115: Common electrode
16: Common signal line
17, 47, 48, 117: Contact portion
20: Counter substrate
21, 41: Supporting substrate
22: Black matrix
23: Color filter
24: Overcoat layer
25, 45: Alignment film
26, 46: Polarizing plate
30: Liquid crystal layer
31, 131: Liquid crystal molecules
42: First insulating film
43: Second insulating film
44: Third insulating film, Interlayer insulating film
45: Alignment film
101: Display screen
102: Touch pen
103: Trace unevenness

The invention claimed is:
1. A liquid crystal display device comprising:
a pair of substrates; and
a liquid crystal layer interposed between the pair of substrates, wherein one of the pair of substrates includes a scanning signal line, a data signal line, pixel electrodes with a comb-tooth portion, a plate-like common electrode, and an interlayer insulating film provided between the pixel electrodes and the common electrode, the comb-tooth portion of each of the pixel electrodes includes a straight portion and a bent portion, the bent portion is provided at least at one end of the comb-tooth portion, and the interlayer insulating film is thinner at a position overlapping with the bent portion than at a position overlapping with the straight portion.

2. The liquid crystal display device according to claim 1, wherein the bent portion is provided at both ends of the comb-tooth portion.

3. The liquid crystal display device according to claim 1, wherein the bent portion is provided at the center of the comb-tooth portion.

4. The liquid crystal display device according to claim 1, wherein an angle $\gamma$ formed between a major axis orientation of the bent portion and an extending orientation of the scanning signal line and an angle $\beta$ formed between an orientation of alignment and the scanning signal line satisfy a relationship of $(135-\beta)°<\gamma<90°$.

5. The liquid crystal display device according to claim 1, wherein the pixel electrodes are arranged side by side with the scanning signal line or the data signal line therebetween, and the interlayer insulating film is thicker at a position between the pixel electrodes arranged side by side than at a position overlapping with the comb-tooth portion of each of the pixel electrodes.

6. The liquid crystal display device according to claim 1, further comprising a voltage applying means that sets potentials of the pixel electrodes adjacent to each other have opposite polarity based on a potential of the common electrode.

* * * * *